US012567119B1

(12) United States Patent
McGoffin

(10) Patent No.: US 12,567,119 B1
(45) Date of Patent: Mar. 3, 2026

(54) AUTONOMOUS TRANSPORTATION SYSTEMS AND METHODS

(71) Applicant: Brendan Joseph McGoffin, Sedro-Woolley, WA (US)

(72) Inventor: Brendan Joseph McGoffin, Sedro-Woolley, WA (US)

( * ) Notice: Subject to any disclaimer, the term of this patent is extended or adjusted under 35 U.S.C. 154(b) by 0 days.

(21) Appl. No.: 18/791,737

(22) Filed: Aug. 1, 2024

Related U.S. Application Data

(63) Continuation of application No. 18/481,930, filed on Oct. 5, 2023, now abandoned, which is a continuation of application No. 17/023,164, filed on Sep. 16, 2020, now abandoned.

(60) Provisional application No. 62/900,662, filed on Sep. 16, 2019.

(51) Int. Cl.
| | |
|---|---|
| *G06Q 20/00* | (2012.01) |
| *G06Q 10/02* | (2012.01) |
| *G06Q 30/0645* | (2023.01) |
| *G06Q 50/40* | (2024.01) |

(52) U.S. Cl.
CPC ............ *G06Q 50/40* (2024.01); *G06Q 10/02* (2013.01); *G06Q 30/0645* (2013.01); *G06Q 2220/00* (2013.01)

(58) Field of Classification Search
CPC .... G06Q 50/40; G06Q 10/02; G06Q 30/0645; G06Q 2220/00
USPC ................. 705/16, 21, 59; 380/44, 262, 278
See application file for complete search history.

(56) References Cited

U.S. PATENT DOCUMENTS

| | | | |
|---|---|---|---|
| 10,409,282 B2 | 9/2019 | Iagnemma et al. | |
| 10,776,879 B1 | 9/2020 | Floyd | |
| 10,839,684 B2 | 11/2020 | Chase | |
| 2020/0272945 A1* | 8/2020 | Manamohan | ......... G06N 20/00 |

OTHER PUBLICATIONS

Autonomy Chain—https://www.autonomychain.com/.
DAV—https://dav.network.
Gerald Fenech, The Link Between Autonomous Vehicles and Blockchain, Oct. 30, 2018, https://www.forbes.com/sites/mastercard/2020/11/10/rising-to-the-moment-how-3-small-businesses-thrive-while-giving-back/?sh=769615ed145d.

* cited by examiner

*Primary Examiner* — Dante Ravetti
(74) *Attorney, Agent, or Firm* — Michael R. Schacht; Bronte Brillantes; Schacht Law Office, Inc.

(57) ABSTRACT

An autonomous transportation system for allowing end users to arrange for use of vehicles owned by vehicle operators comprising at least one user device, at least one vehicle device, at least one smart contract blockchain system, and at least one smart contract. Each user device is associated with one of end users. The at least one user device allows at least one end user to enter bid parameters. Each vehicle is associated with at least one vehicle device. The at least one vehicle operator defines at least one set of vehicle parameters associated with each vehicle. Each smart contract coordinates acceptance of bids by comparing bid parameters and vehicle parameters and storage of bids by the at least one smart contract block chain system.

18 Claims, 29 Drawing Sheets

Brief Overview

Registering a User

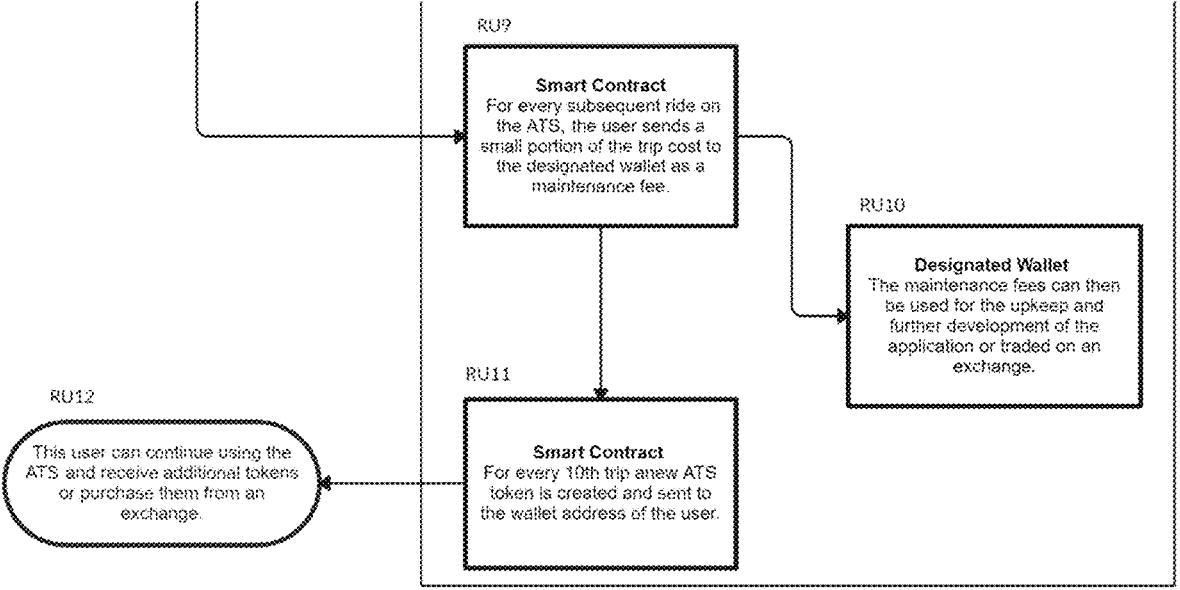

RU9

Smart Contract
For every subsequent ride on
the ATS, the user sends a
small portion of the trip cost to
the designated wallet as a
maintenance fee.

RU10

Designated Wallet
The maintenance fees can then
be used for the upkeep and
further development of the
application or traded on an
exchange.

RU12

This user can continue using the
ATS and receive additional tokens
or purchase them from an
exchange.

RU11

Smart Contract
For every 10th trip a new ATS
token is created and sent to
the wallet address of the user.

FIG. 5 Continued

Registering a Vehicle

Single Vehicle Hail

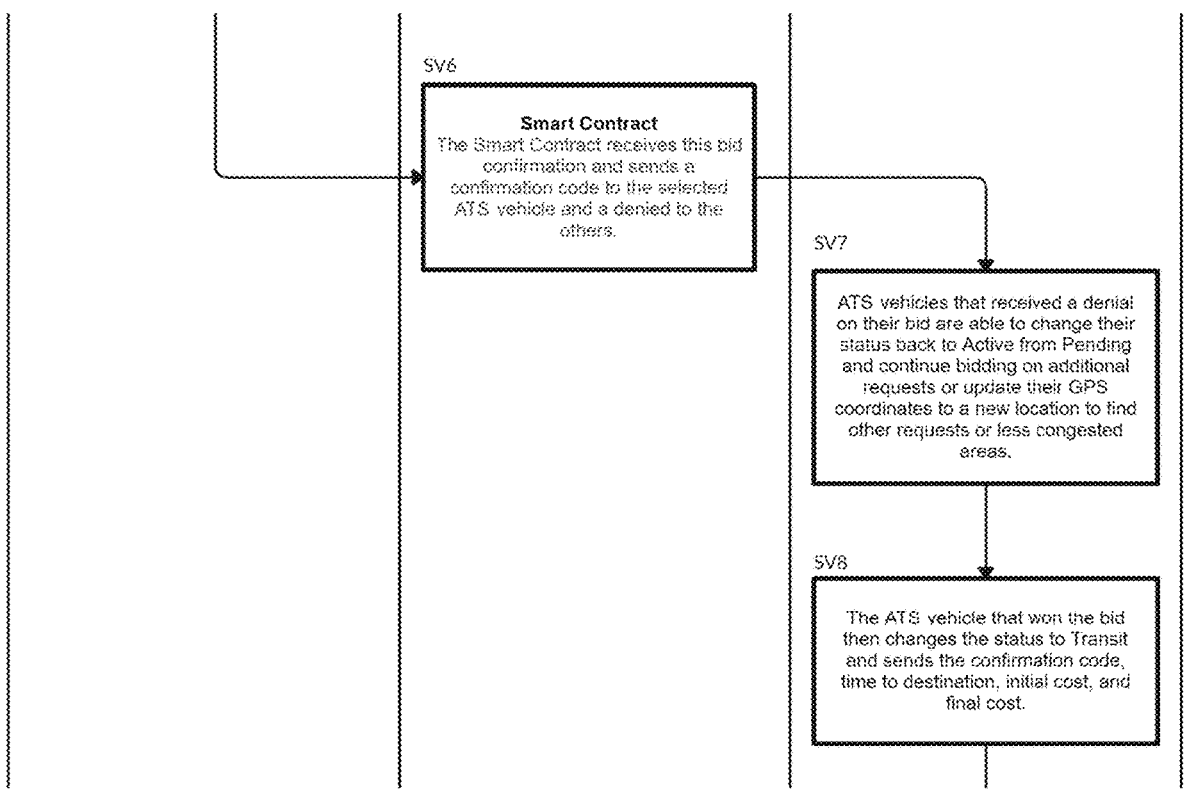

SV6

Smart Contract
The Smart Contract receives this bid confirmation and sends a confirmation code to the selected ATS vehicle and a denied to the others.

SV7

ATS vehicles that received a denial on their bid are able to change their status back to Active from Pending and continue bidding on additional requests or update their GPS coordinates to a new location to find other requests or less congested areas.

SV8

The ATS vehicle that won the bid then changes the status to Transit and sends the confirmation code, time to destination, initial cost, and final cost.

FIG. 7 Continued

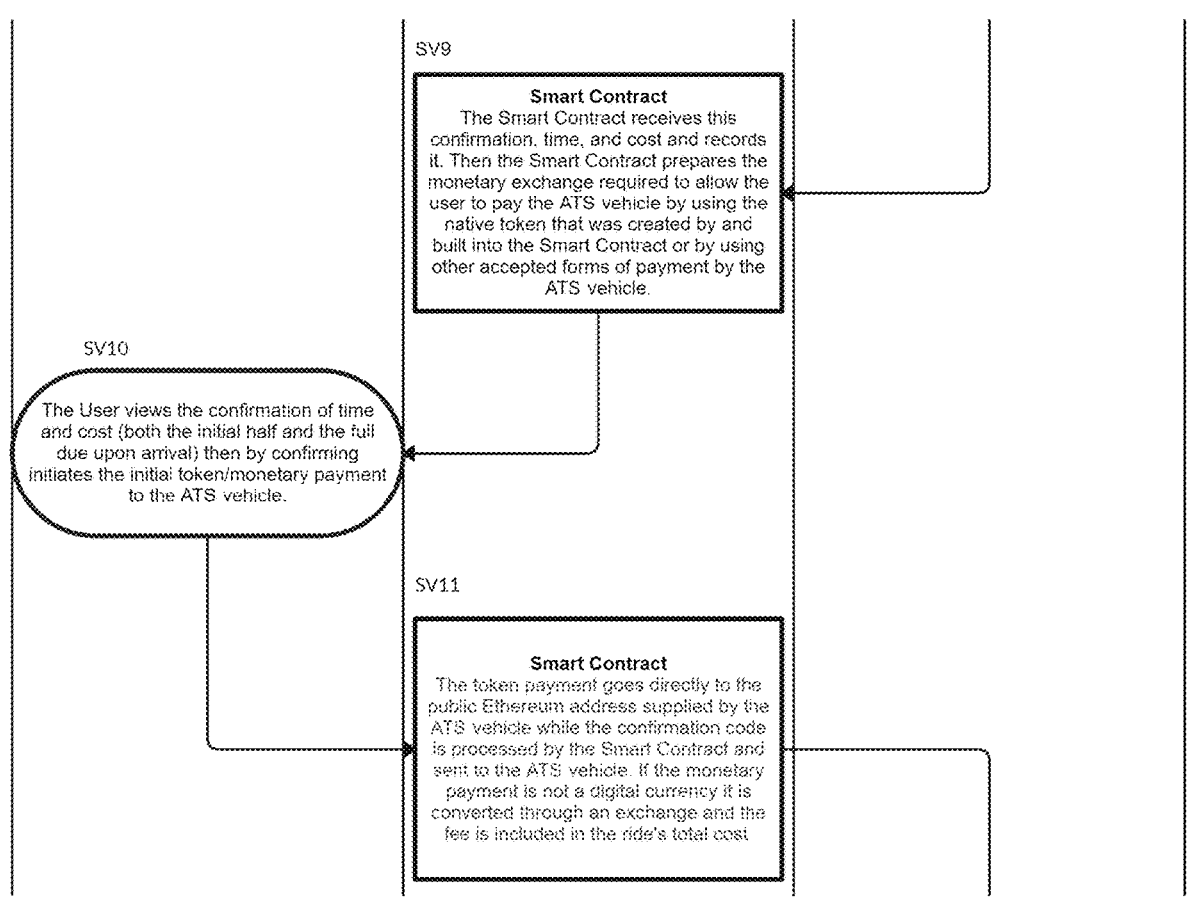

SV9

Smart Contract
The Smart Contract receives this
confirmation, time, and cost and records
it. Then the Smart Contract prepares the
monetary exchange required to allow the
user to pay the ATS vehicle by using the
native token that was created by and
built into the Smart Contract or by using
other accepted forms of payment by the
ATS vehicle.

SV10

The User views the confirmation of time
and cost (both the initial half and the full
due upon arrival) then by confirming
initiates the initial token/monetary payment
to the ATS vehicle.

SV11

Smart Contract
The token payment goes directly to the
public Ethereum address supplied by the
ATS vehicle while the confirmation code
is processed by the Smart Contract and
sent to the ATS vehicle. If the monetary
payment is not a digital currency it is
converted through an exchange and the
fee is included in the ride's total cost

FIG 7 Continued

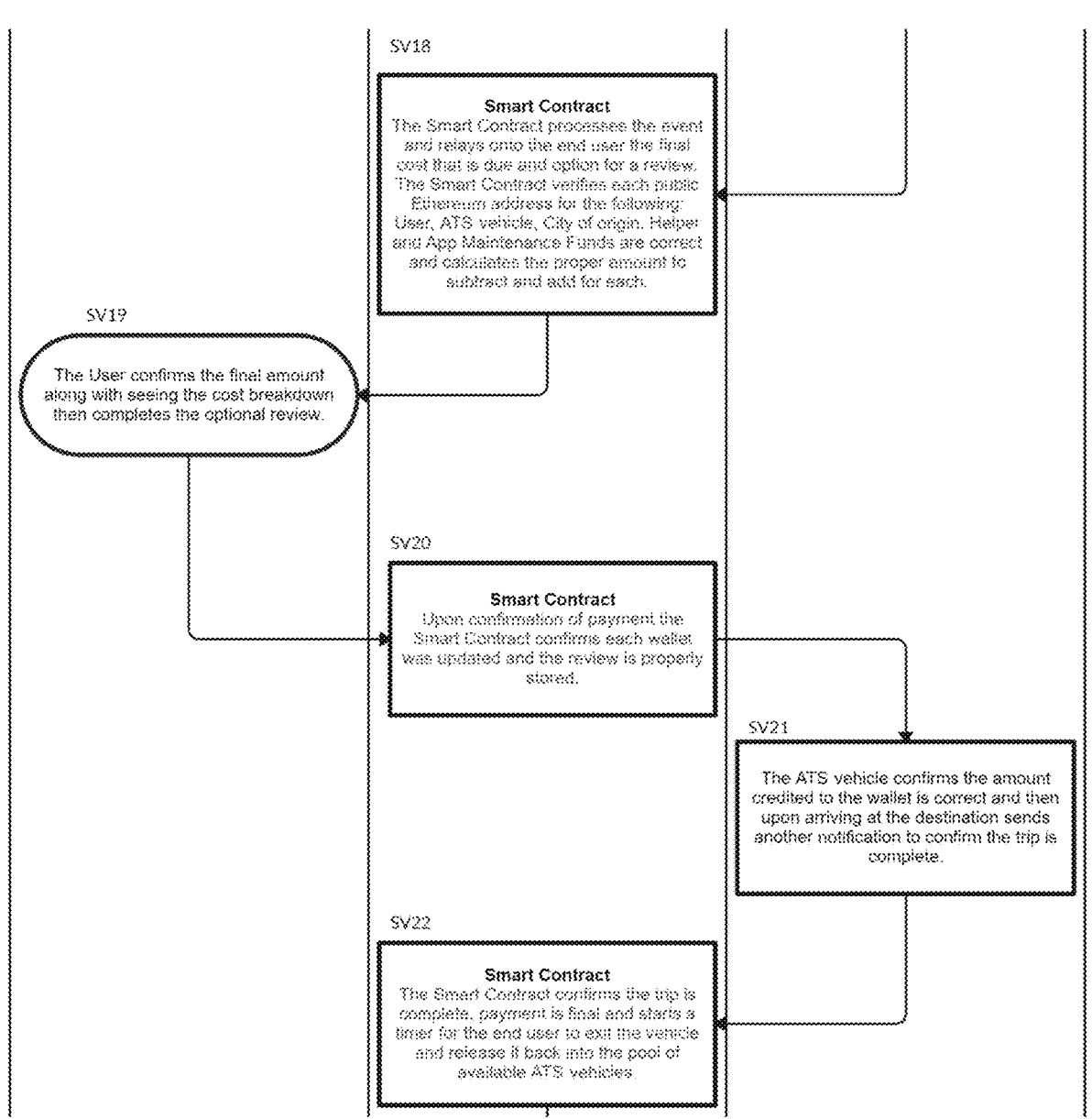

SV18

Smart Contract
The Smart Contract processes the event and relays onto the end user the final cost that is due and option for a review. The Smart Contract verifies each public Ethereum address for the following: User, ATS vehicle, City of origin, Helper and App Maintenance Funds are correct and calculates the proper amount to subtract and add for each.

SV19

The User confirms the final amount along with seeing the cost breakdown then completes the optional review.

SV20

Smart Contract
Upon confirmation of payment the Smart Contract confirms each wallet was updated and the review is properly stored.

SV21

The ATS vehicle confirms the amount credited to the wallet is correct and then upon arriving at the destination sends another notification to confirm the trip is complete.

SV22

Smart Contract
The Smart Contract confirms the trip is complete, payment is final and starts a timer for the end user to exit the vehicle and release it back into the pool of available ATS vehicles.

FIG. 7 Continued

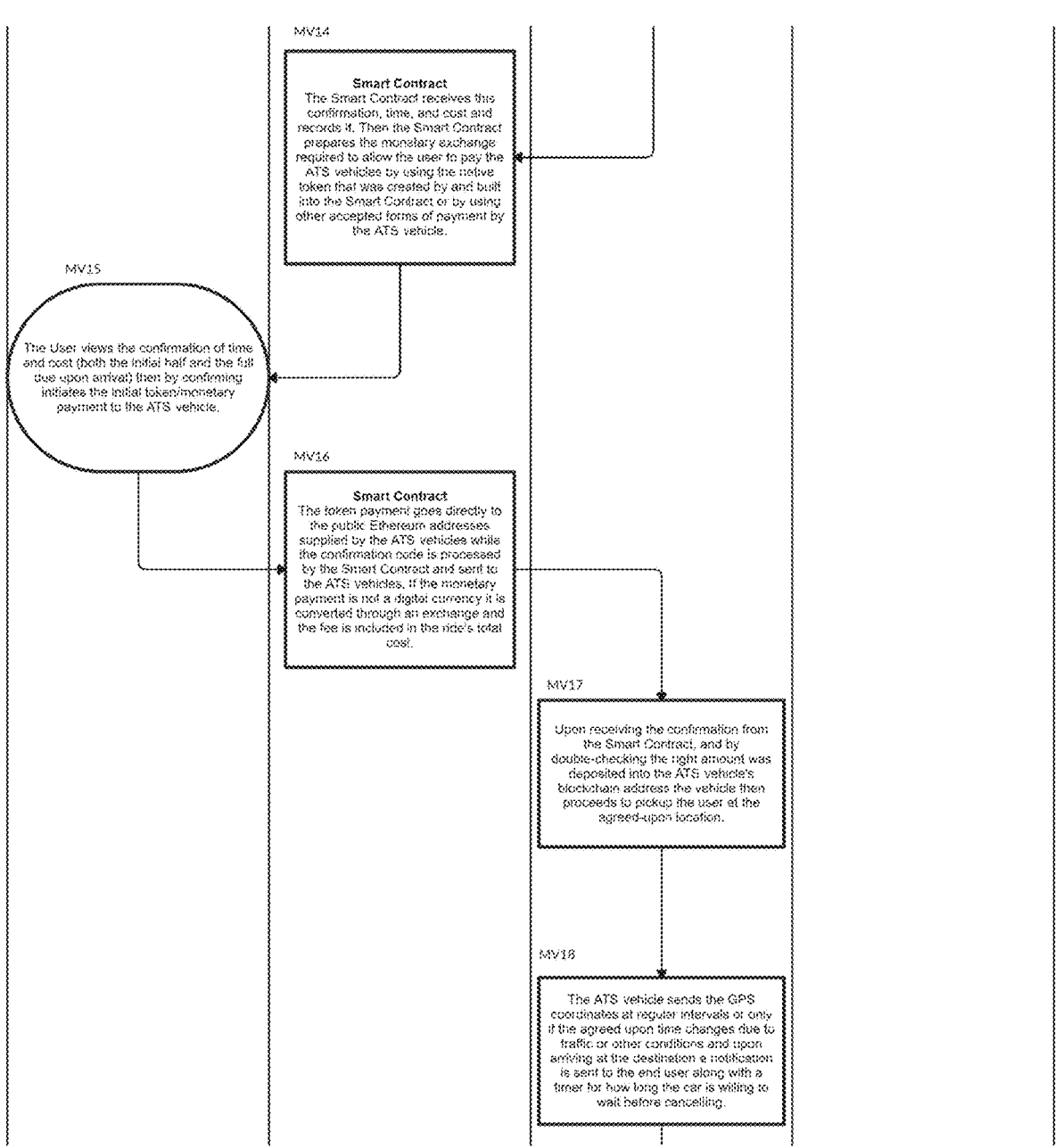

MV14

Smart Contract
The Smart Contract receives this confirmation, time, and cost and records it. Then the Smart Contract prepares the monetary exchange required to allow the user to pay the ATS vehicles by using the native token that was created by and built into the Smart Contract or by using other accepted forms of payment by the ATS vehicle.

MV15

The User views the confirmation of time and cost (both the initial half and the full due upon arrival) then by confirming initiates the initial token/monetary payment to the ATS vehicle.

MV16

Smart Contract
The token payment goes directly to the public Ethereum addresses supplied by the ATS vehicles while the confirmation code is processed by the Smart Contract and sent to the ATS vehicles. If the monetary payment is not a digital currency it is converted through an exchange and the fee is included in the ride's total cost.

MV17

Upon receiving the confirmation from the Smart Contract, and by double-checking the right amount was deposited into the ATS vehicle's blockchain address the vehicle then proceeds to pickup the user at the agreed-upon location.

MV18

The ATS vehicle sends the GPS coordinates at regular intervals or only if the agreed upon time changes due to traffic or other conditions and upon arriving at the destination a notification is sent to the end user along with a timer for how long the car is willing to wait before cancelling.

FIG. 8 Continued

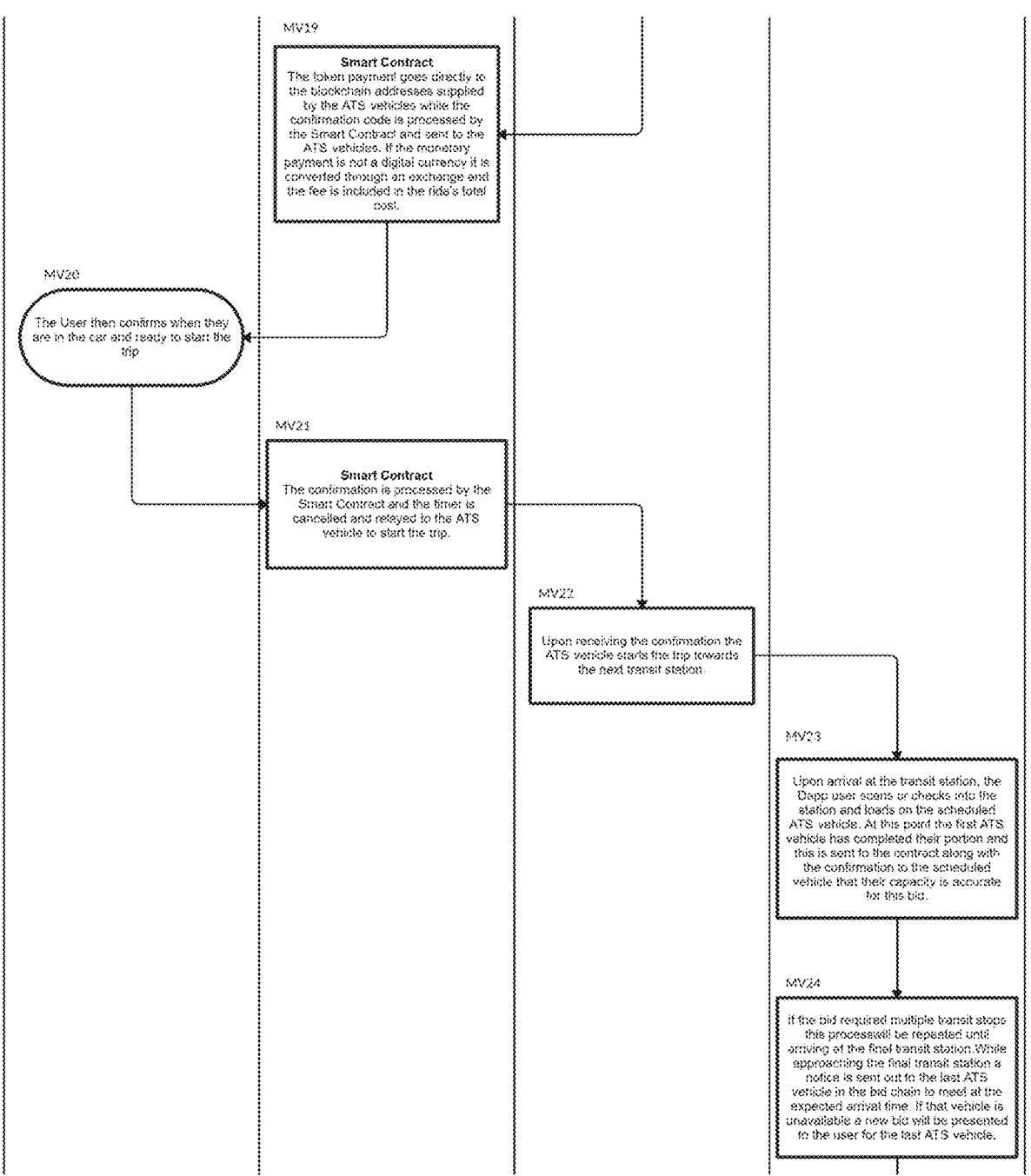

MV19

Smart Contract
The token payment goes directly to the blockchain addresses supplied by the ATS vehicles while the confirmation code is processed by the Smart Contract and sent to the ATS vehicles. If the monetary payment is not a digital currency it is converted through an exchange and the fee is included in the ride's total cost.

MV20

The User then confirms when they are in the car and ready to start the trip

MV21

Smart Contract
The confirmation is processed by the Smart Contract and the timer is cancelled and relayed to the ATS vehicle to start the trip.

MV22

Upon receiving the confirmation the ATS vehicle starts the trip towards the next transit station

MV23

Upon arrival at the transit station, the Dapp user scans or checks into the station and loads on the scheduled ATS vehicle. At this point the first ATS vehicle has completed their portion and this is sent to the contract along with the confirmation to the scheduled vehicle that their capacity is accurate for this bid.

MV24

If the bid required multiple transit stops this process will be repeated until arriving at the final transit station. While approaching the final transit station a notice is sent out to the last ATS vehicle in the bid chain to meet at the expected arrival time. If that vehicle is unavailable a new bid will be presented to the user for the last ATS vehicle.

FIG. 8 Continued

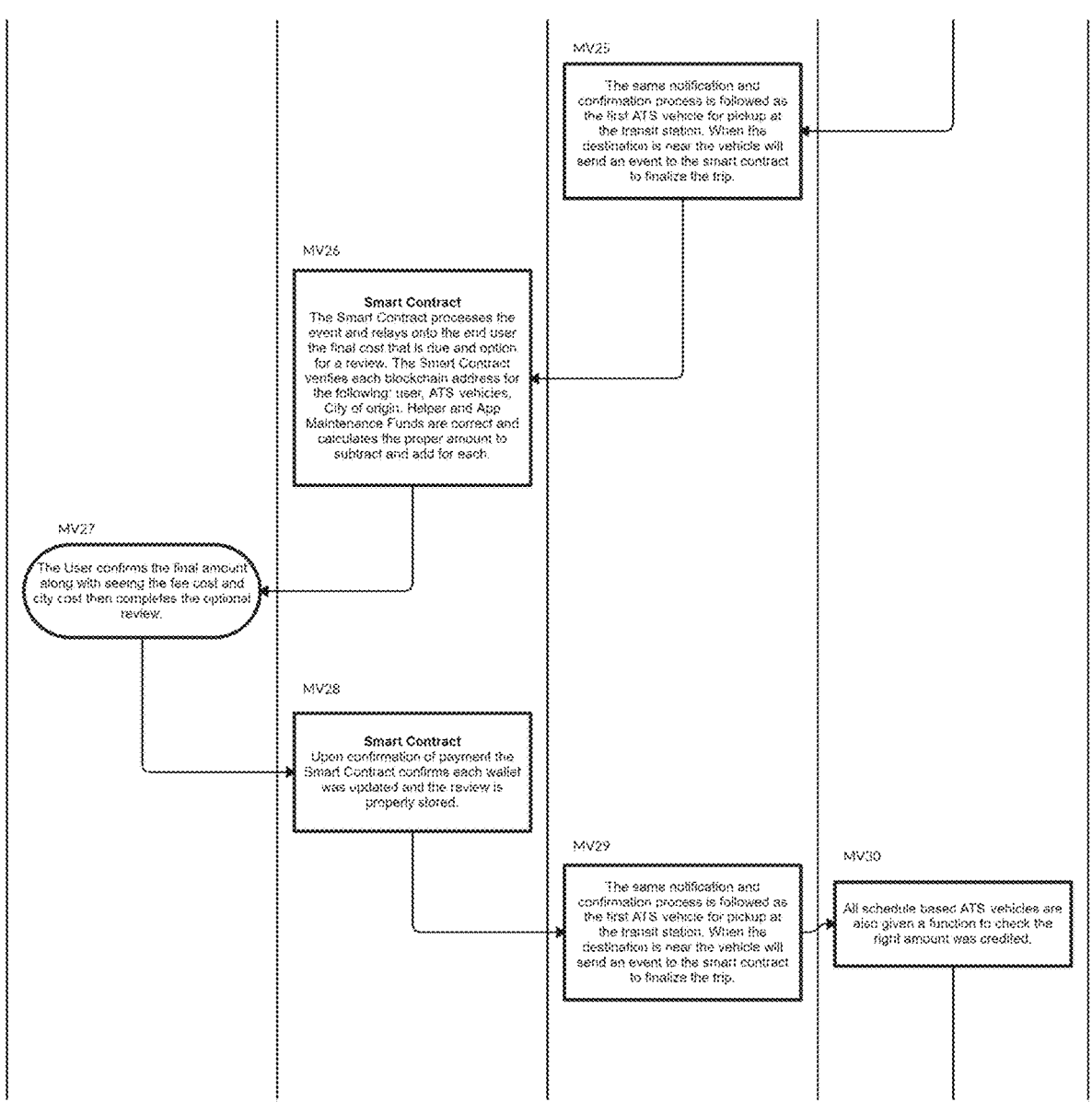

MV25

The same notification and confirmation process is followed as the first ATS vehicle for pickup at the transit station. When the destination is near the vehicle will send an event to the smart contract to finalize the trip.

MV26

Smart Contract
The Smart Contract processes the event and relays onto the end user the final cost that is due and option for a review. The Smart Contract verifies each blockchain address for the following: user, ATS vehicles, City of origin, Helper and App Maintenance Funds are correct and calculates the proper amount to subtract and add for each.

MV27

The User confirms the final amount along with seeing the fee cost and city cost then completes the optional review.

MV28

Smart Contract
Upon confirmation of payment the Smart Contract confirms each wallet was updated and the review is properly stored.

MV29

The same notification and confirmation process is followed as the first ATS vehicle for pickup at the transit station. When the destination is near the vehicle will send an event to the smart contract to finalize the trip.

MV30

All schedule based ATS vehicles are also given a function to check the right amount was credited.

FIG. 8 Continued

Payment Workflow

Loyalty Program Workflow

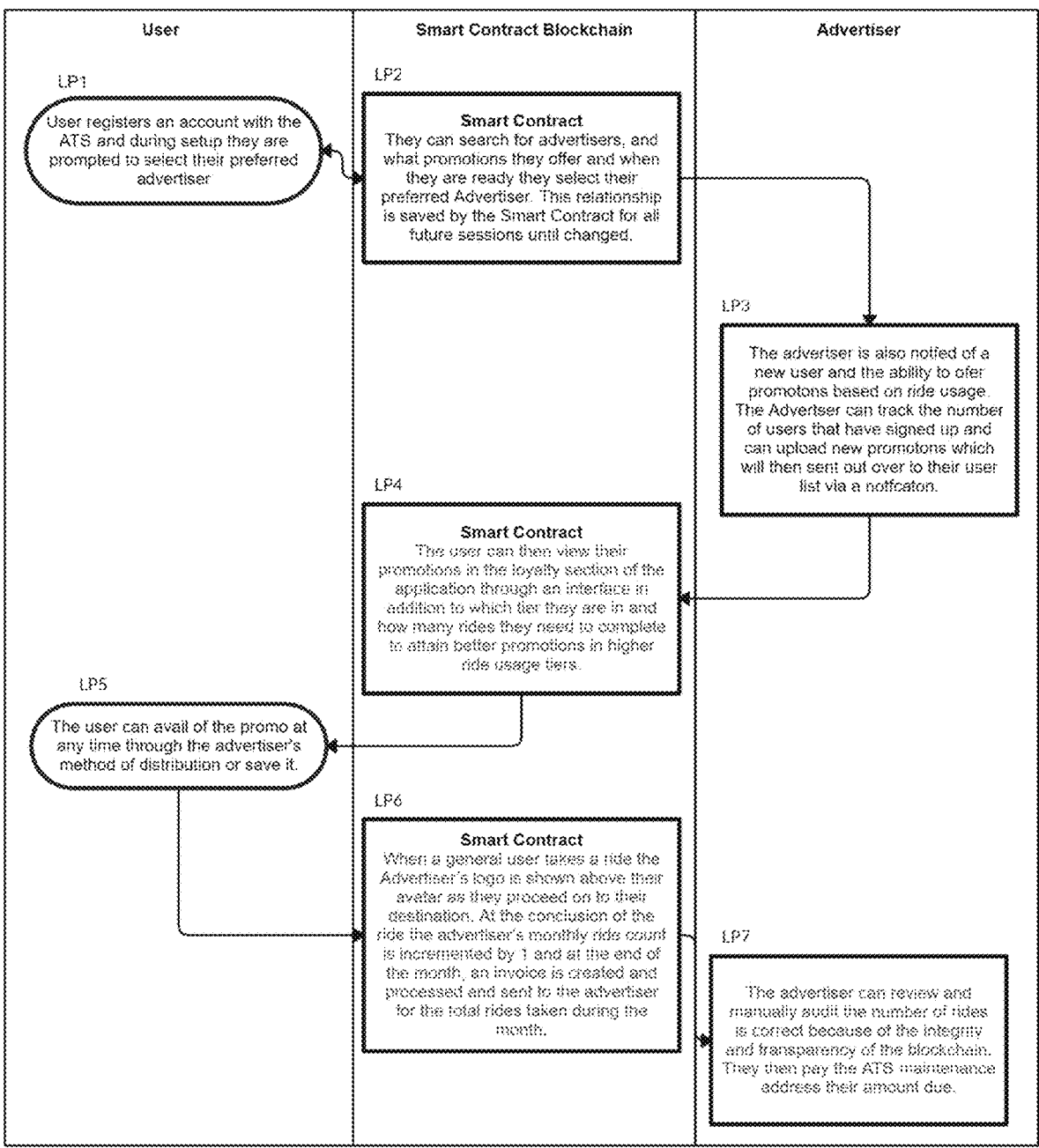

| User | Smart Contract Blockchain | Advertiser |
|------|--------------------------|------------|

LP1

User registers an account with the ATS and during setup they are prompted to select their preferred advertiser

LP2

Smart Contract
They can search for advertisers, and what promotions they offer and when they are ready they select their preferred Advertiser. This relationship is saved by the Smart Contract for all future sessions until changed.

LP3

The advertiser is also notifed of a new user and the ability to ofer promotons based on ride usage. The Advertser can track the number of users that have signed up and can upload new promotons which will then sent out over to their user list via a notfcaton.

LP4

Smart Contract
The user can then view their promotions in the loyalty section of the application through an interface in addition to which tier they are in and how many rides they need to complete to attain better promotions in higher ride usage tiers.

LP5

The user can avail of the promo at any time through the advertiser's method of distribution or save it.

LP6

Smart Contract
When a general user takes a ride the Advertiser's logo is shown above their avatar as they proceed on to their destination. At the conclusion of the ride the advertiser's monthly ride count is incremented by 1 and at the end of the month, an invoice is created and processed and sent to the advertiser for the total rides taken during the month.

LP7

The advertiser can review and manually audit the number of rides is correct because of the integrity and transparency of the blockchain. They then pay the ATS maintenance address their amount due.

FIG. 11

Helper Program Workflow

Transit Token based on Voting

AUTONOMOUS TRANSPORTATION SYSTEMS AND METHODS

RELATED APPLICATIONS

This application, U.S. patent application Ser. No. 18/791, 737 filed Aug. 1, 2024, is a continuation of U.S. patent application Ser. No. 18/481,930 filed Oct. 5, 2023, now abandoned.

U.S. patent application Ser. No. 18/481,930 filed Oct. 5, 2023, is a continuation of U.S. patent application Ser. No. 17/023,164 filed Sep. 16, 2020, now abandoned.

U.S. patent application Ser. No. 17/023,164 filed Sep. 16, 2020, claims benefit of U.S. Provisional Application Ser. No. 62/900,662 filed Sep. 16, 2019, the contents of which are incorporated herein by reference.

TECHNICAL FIELD

The present invention relates to autonomous transportation systems and methods and, more specifically, to autonomous transportation systems and methods that facilitate connections between end users and vehicle operators.

BACKGROUND

Autonomous vehicles are being tested by multiple vehicle manufacturers and will likely be used in many ride-hailing and other transportation (e.g., delivery) services. If every manufacturer created an application to allow end users (e.g., riders) to hail vehicles, end users would be exposed to a glut of ride-hailing applications. The need thus exists for a single application to act as an intermediary between the various autonomous vehicle manufacturers and the users looking to hail a ride or arrange for other transportation services.

End users will further likely be exposed to at least some level of advertising associated with ride-hailing services. Advertising associated with ride-hailing applications could be general advertising intended to build brand loyalty and advertising displayed to users while using the ride-hailing or other transportation services. The need thus further exists for autonomous transportation systems and methods that allow users more choice in what advertising is shown to end users while also giving businesses a better way to build brand loyalty and give out promotions.

While some people desire to choose between transportation options, such as a type of vehicle or level and type of advertisement, there are those in society who need ride-hailing and other transportation services but are not in a position financially to pay for such services. While many government and non-profit entities have been created to provide transportation services to low-income individuals, the need exists for autonomous transportation systems and methods that facilitate the provision of ride-hailing and other transportation services to low-income individuals.

SUMMARY

The present invention may be embodied as an autonomous transportation system for allowing end users to arrange for use of vehicles owned by vehicle operators comprising at least one user device, at least one vehicle device, at least one smart contract blockchain system, and at least one smart contract. Each user device is associated with one of end users. The at least one user device allows at least one end user to enter bid parameters. Each vehicle is associated with at least one vehicle device. The at least one vehicle operator defines at least one set of vehicle parameters associated with each vehicle. Each smart contract coordinates acceptance of bids by comparing bid parameters and vehicle parameters and storage of bids by the at least one smart contract block chain system.

The present invention may be embodied as a method of arranging use by end users of vehicles owned by vehicle operators comprising the following steps. At least one user device is associated with each end user. The at least one end user is allowed to enter bid parameters using the at least one user device. Associating at least one vehicle device with each vehicle. The at least one vehicle operator is allowed to define a at least one set of vehicle parameters for each vehicle. Coordinating formation of at least one smart contract by comparing bid parameters and vehicle parameters. Storing the at least one smart contract stored using at least one smart contract blockchain system.

BRIEF DESCRIPTION OF THE DRAWINGS

FIG. 11 is a schematic logic diagram illustrating an example loyalty program workflow method that may be used by any of the example ATS systems or methods of the present invention;

<center>DETAILED DESCRIPTION</center>

<center>I. Example Autonomous Transportation Systems</center>

The present invention may be embodied as an autonomous transportation system or method configured to facilitate the formation of transportation contracts between autonomous vehicle operators and vehicle end users. In particular, the present invention may be embodied as an autonomous transportation system or method that allows at least one vehicle end user, and typically multiple (i.e., at least two) vehicle end users, to choose between multiple (i.e., at least two) autonomous vehicles from multiple (i.e., at least two) owners of autonomous vehicles. Several different autonomous transportation systems and methods constructed in accordance with the principles of the present invention will be described below.

A. First Example Autonomous Transportation System

Figure 1:
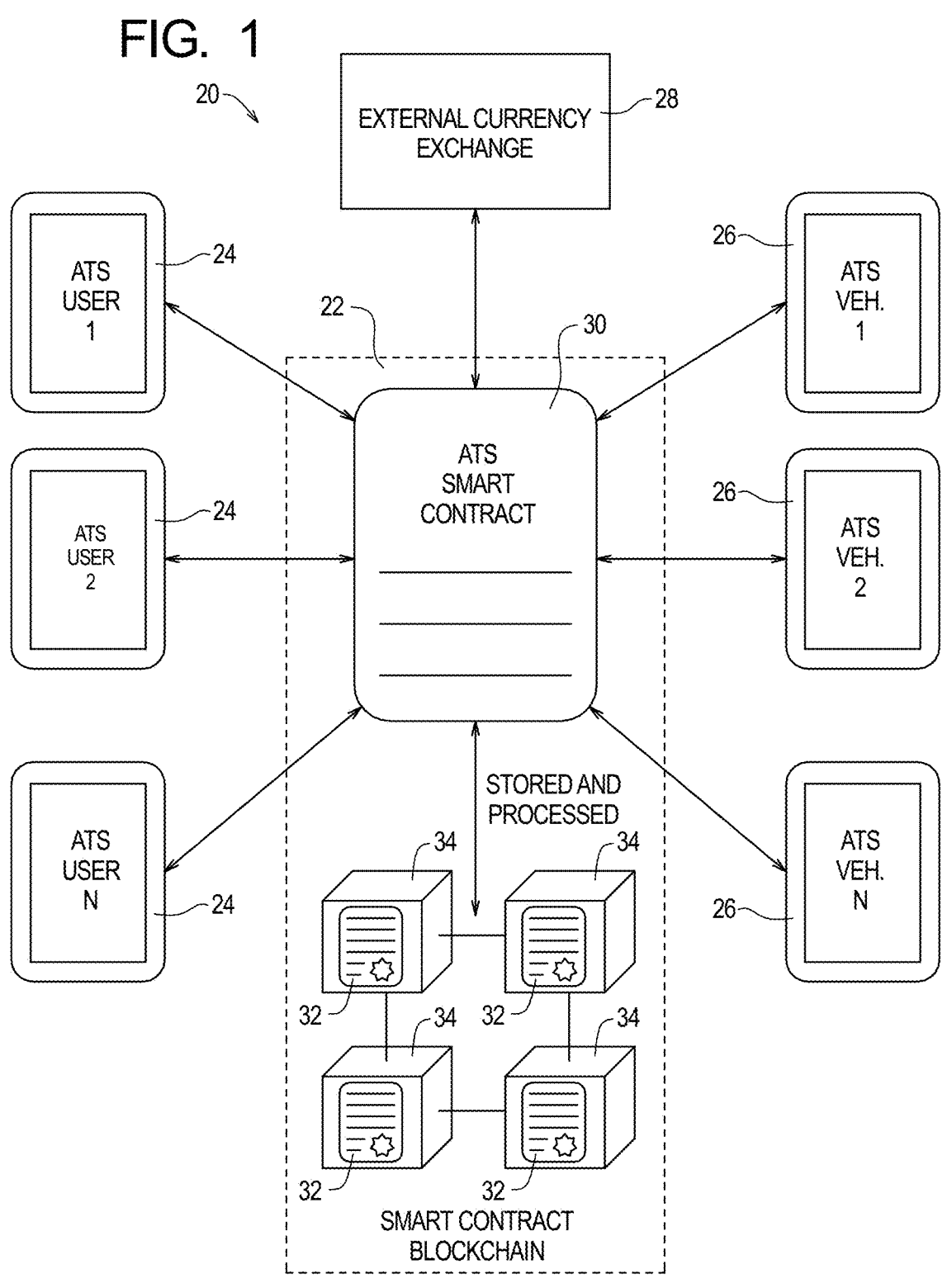
FIG. 1 is a basic block diagram of a first autonomous transportation system of the present invention.

Referring initially to FIG. 1 of the drawing, depicted therein is a first example autonomous transportation system (ATS) 20 configured to coordinate, using a smart contract blockchain system 22, transportation transactions between one or more user devices 24 operated by end users and multiple vehicle devices 26 associated with vehicles owned and operated by vehicle operators. Typically, but not necessarily, the first example ATS 20 is configured to include or interface with an external currency exchange system 28 that transfers funds between the end users associated with the end user devices 24 and vehicle operators associated with the vehicle devices 26.

The example smart contract blockchain system 22 has or exposes a function that is invoked by the user to create a new bid request within the smart contract for ATS vehicles to bid on. The ATS vehicles all bid on this specific request and send it to the smart contract. The smart contract maps the bids to the correct bid request, and presents the bids to the user. When the user accepts one of the bids, the smart contract finalizes the original bid request, and this transaction becomes permanent and immutable on the smart contract blockchain by use of ledgers and nodes defined by or forming a part of the smart contract blockchain. The use of ledgers associated with nodes of a blockchain system is generally known and will not be described herein beyond that extent helpful to a complete understanding of the present invention.

The example smart contract blockchain system 22 contains logic that coordinates the formation of the ATS smart contract 30 between the end users associated with the user device(s) 24 and the vehicle operators associated with the vehicle devices 26. In particular, vehicle operators set up one or more operator accounts that define registered vehicle parameters associated with each registered vehicle to be made available to end users using the ATS 20. Registered vehicle parameters may include type of vehicle, vehicle manufacturer, vehicle capability, vehicle availability, vehicle service schedule, vehicle repair schedule, vehicle certifications, and vehicle price. The users initiate each ATS bid request function 30 and may define desired transportation parameters. The example smart contract blockchain system 22 contains logic that automates the negotiations among the end users and vehicle operators by comparing a set of desired transportation parameters entered by an end user with registered vehicle parameters associated with one or more registered vehicles. Based on this comparison, at least one ATS vehicle bid is accepted by the user and the finalized bid request is stored in one or more ledgers 32 on one or more blockchain nodes 34.

The example smart contract blockchain system 22 of the example ATS system 20 is configured to allow an end user to define desired transportation parameters and then to coordinate the use of one or more registered vehicles to satisfy the desired transportation parameters. For example, an end user may define desired transportation parameters by specifying an origination point, a destination point, and an arrival time. In one case, the example smart contract blockchain system 22 may determine that a single registered vehicle will satisfy a particular set of desired transportation parameters. In another case, the example smart contract blockchain system 22 may determine that, to satisfy a particular set of desired transportation parameters, multiple registered vehicles may be optimal. If multiple registered vehicles are optimal, the example ATS system 20 is capable of coordinating the use of registered vehicles operated by multiple, unaffiliated vehicle operators.

B. Second Example Autonomous Transportation System

Figure 2:
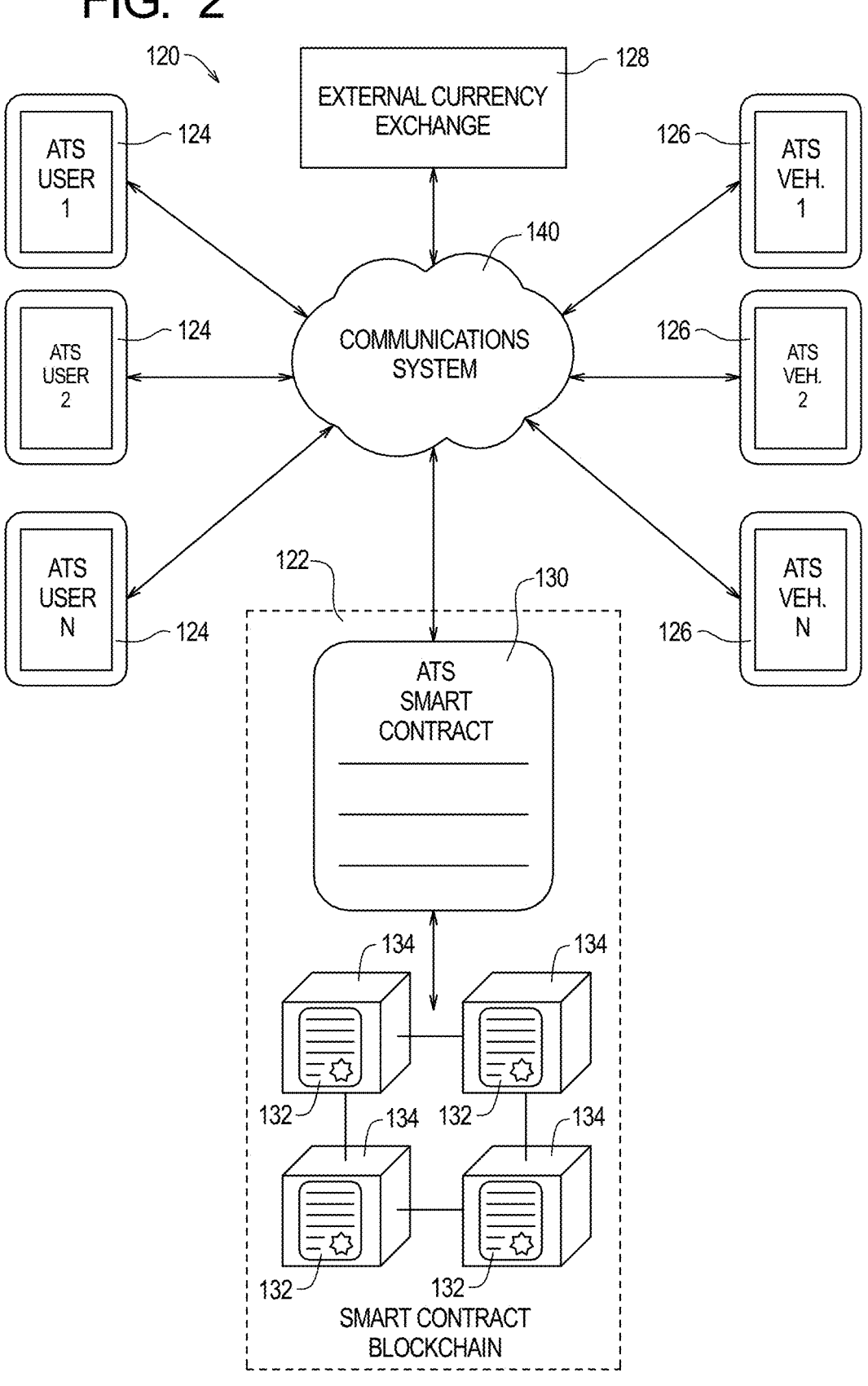
FIG. 2 is a basic block diagram of a second example autonomous transportation system of the present invention.

Referring now to FIG. 2 of the drawing, depicted therein is a second example autonomous transportation system (ATS) 120 configured to coordinate, using a smart contract blockchain system 122, transportation transactions between one or more user devices 124 operated by end users and multiple vehicle devices 126 associated with vehicles owned and operated by vehicle operators. Typically, but not necessarily, the second example ATS 120 is configured to include or interface with an external currency exchange system 128 that transfers funds between the end users associated with the end user devices 124 and vehicle operators associated with the vehicle devices 126.

The example smart contract blockchain system 122 has or exposes a function that is invoked by the user to create a new bid request within the smart contract for ATS vehicles to bid on. The ATS vehicles all bid on this specific request and send it to the smart contract. The smart contract maps the bids to the correct bid request and presents the bids to the user. When the user accepts one of the bids, the smart contract finalizes the original bid request, and this transaction becomes permanent and immutable on the smart contract blockchain. The use of ledgers associated with nodes of a blockchain system is generally known and will not be described herein beyond that extent helpful to a complete understanding of the present invention.

The example ATS system 120 further comprises a data communications system 140 to facilitate communication between the smart contract blockchain system 122, the user devices 124, and the vehicle devices 126. The example data communications system 140 may be a public data communications systems such as the Internet, a private data communications system such as a telephony system, or a combination of public and private data communications systems.

Like the first example smart contract blockchain system 22 described above, the example smart contract blockchain system 122 contains logic that coordinates the formation of ATS bid requests 130 between the end users associated with the user device(s) 124 and the vehicle operators associated with the vehicle devices 126. In particular, vehicle operators set up one or more operator accounts that define registered vehicle parameters associated with each registered vehicle to be made available to end users using the ATS 120. Registered vehicle parameters may include type of vehicle, vehicle manufacturer, vehicle capability, vehicle availability, vehicle service schedule, vehicle repair schedule, and vehicle price. The users initiate each ATS smart contract 130 by defining desired transportation parameters. The example smart contract blockchain system 122 contains logic that automates the negotiations among the end users and vehicle operators by comparing a set of desired transportation parameters entered by an end user with registered vehicle parameters associated with one or more registered vehicles. Based on this comparison, at least one ATS vehicle bid is accepted by the user and the finalized bid request is stored in one or more ledgers 32 on one or more blockchain nodes 134.

The example smart contract blockchain system 122 of the example ATS system 120 is configured to allow an end user to define desired transportation parameters and then to coordinate the use of one or more registered vehicles to satisfy the desired transportation parameters. For example, an end user may define desired transportation parameters by specifying an origination point, a destination point, and an arrival time. In one case, the example smart contract blockchain system 122 may determine that a single registered vehicle will satisfy a particular set of desired transportation parameters. In another case, the example smart contract blockchain system 122 may determine that, to satisfy a particular set of desired transportation parameters, multiple registered vehicles may be optimal. If multiple registered vehicles are optimal, the example ATS system 120 is capable of coordinating the use of registered vehicles operated by multiple, unaffiliated vehicle operators.

C. Example Autonomous Transportation System Software Architecture

Figure 3:
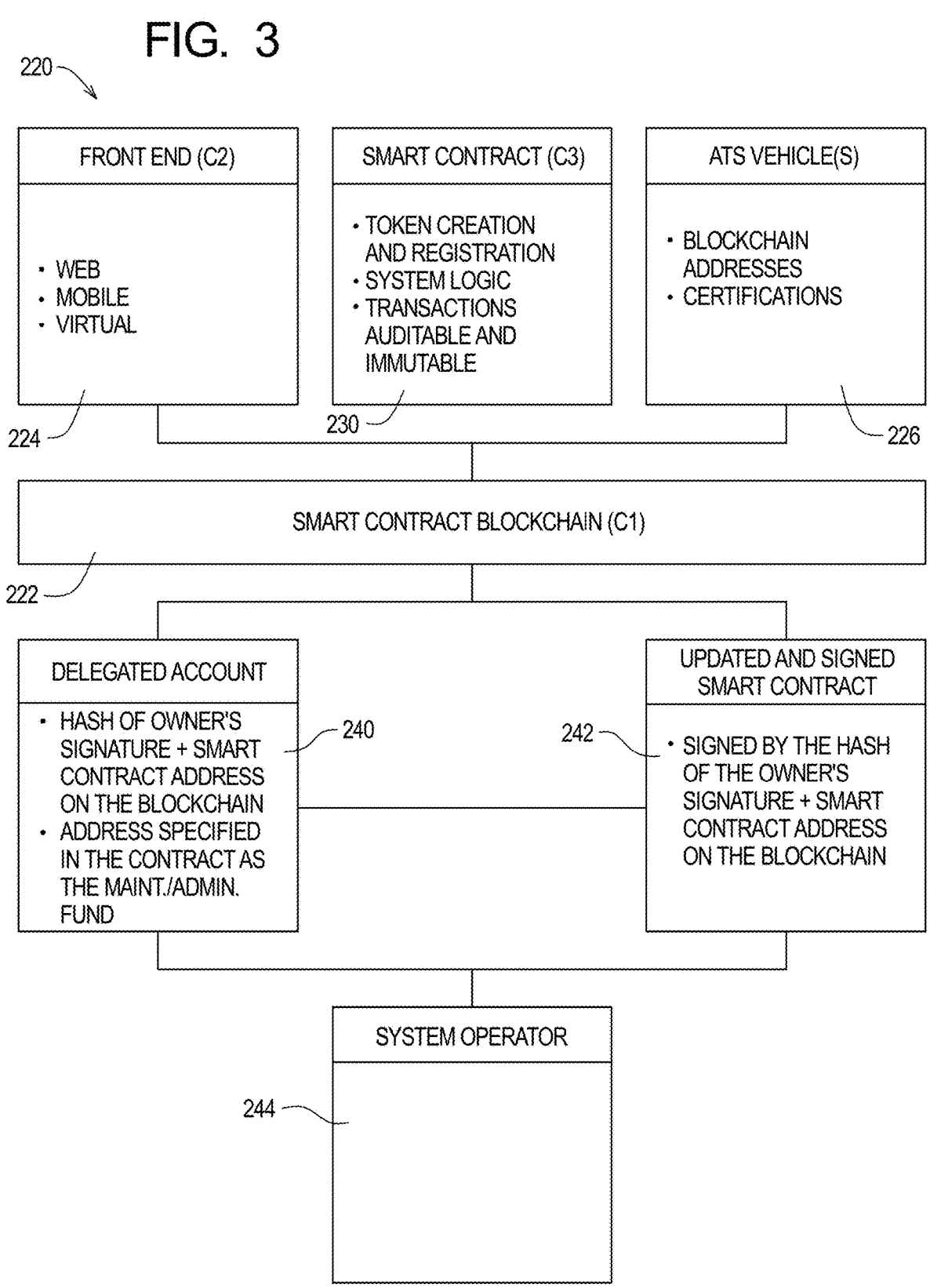
FIG. 3 is a system architecture schematic logic diagram of a first example autonomous transportation system software architecture of the present invention.

Referring now to FIG. 3 of the drawing, depicted therein is an example autonomous transportation system (ATS) software architecture 220 configured to implement a smart contract blockchain system 222 capable of coordinating transportation transactions between one or more user devices displaying user interfaces 224 operated by end users and multiple vehicle devices displaying ATS vehicle interfaces 226 associated with vehicles owned and operated by vehicle operators. Typically, but not necessarily, the second example ATS 220 is configured to include or interface with an external currency exchange system (not shown) that transfers funds between the end users associated with the end user interfaces 224 and vehicle operators associated with the vehicle interfaces 226.

The example smart contract blockchain system software architecture 220 has or exposes a function that is invoked by the users of the interfaces 224 to create a new bid request within a smart contract 230 for ATS vehicles to bid on. The ATS vehicles all bid on this specific request using the vehicle interfaces 226 and send a bid to a smart contract 230 maintained by the smart contract blockchain system 222 that maps the bids to the correct bid request and presents it to the user. When the user accepts one of the bids the smart contract 230 finalizes the original bid request, and this transaction becomes permanent and immutable on the smart contract blockchain system 222. The use of ledgers associated with nodes of a blockchain system such as the example blockchain system 222 is generally known and will not be described herein beyond that extent helpful to a complete understanding of the present invention.

Like the example ATS system 120 described above, the example ATS software architecture 220 may be configured to operate with a data communications system (not shown) to facilitate communication between the smart contract blockchain system 222, the user interfaces 224, and the vehicle interfaces 226. The example data communications system may be a public data communications systems such as the Internet, a private data communications system such as a telephony system, or a combination of public and private data communications systems.

Like the example smart contract blockchain systems 22 and 122 described above, the example smart contract blockchain system software architecture 222 contains logic that coordinates the formation of the ATS bid request between the end users associated with the user interface(s) 224 and the vehicle operators associated with the vehicle interfaces 226. In particular, vehicle operators set up one or more operator accounts that define registered vehicle parameters associated with each registered vehicle to be made available to end users using the architecture 220. Registered vehicle parameters may include type of vehicle, vehicle manufacturer, vehicle capability, vehicle availability, vehicle service schedule, vehicle certification, vehicle repair schedule, and vehicle price.

The users initiate each ATS bid request by defining desired transportation parameters. The example smart blockchain system 222 of the smart contract blockchain system software architecture 220 contains logic that automates the negotiations among the end users and vehicle operators by comparing a set of desired transportation parameters entered by an end user with registered vehicle parameters associated with one or more registered vehicles. Based on this comparison, at least one ATS vehicle bid is accepted by the user, and the finalized bid request is stored in one or more ledgers 232 on one or more blockchain nodes 234.

The example smart contract blockchain system 222 of the example ATS software architecture 220 is configured to allow an end user to define desired transportation parameters and then to coordinate the use of one or more registered vehicles to satisfy the desired transportation parameters. For example, an end user may define desired transportation parameters by specifying an origination point, a destination point, and an arrival time. In one case, the example smart contract 230 of the smart contract blockchain system 222 may determine that a single registered vehicle will satisfy a particular set of desired transportation parameters. In another case, the example smart contract 230 of the example smart contract blockchain system software architecture 222 may determine that, to satisfy a particular set of desired transportation parameters, multiple registered vehicles may be optimal. If multiple registered vehicles are optimal, the example ATS software architecture 220 is capable of coordinating the use of registered vehicles operated by multiple, unaffiliated vehicle operators.

The example autonomous transportation system (ATS) software architecture 220 thus comprises three interconnected components: the backend infrastructure 222 (C1), an application layer (C2) defining the interfaces 224 and/or 226, and the service provider/API (C3) that integrates the systems 224, 226, and 230. The use of blockchain technology has many advantages to building applications and securing them. The Ethereum Blockchain will be used as the example in the drawings and workflows showing how this app will be controlled by a smart contract. A smart contract is computer code that can be built into the blockchain to facilitate, verify, and/or negotiate a contract agreement between two parties. The basic function of example system software architecture 220 is thus shown in FIG. 4 and examples of this basic function will be described in further detail below with reference to FIGS. 5-13.

C1 is the backend infrastructure that provides all of the storage, networking, and backend processing required to sustain the novel features and services presented by the other 2 components. In the following example, C1 is implemented using Ethereum blockchain technology.

C2 is the application layer that is defined by any interface (mobile app, web app, VR app, etc.) that allows end users, advertisers, non-profit entities, and/or governmental entities to interact with the ATS.

C3 is a service provider/API that integrates into the various vehicle manufacturing systems and vehicles.

In addition to components C1, C2, and C3, the example smart contract blockchain system software architecture 222 contains a delegated account 240 and a smart contract generation system 242 associated with a system operator 244. The system operator 242 has access to the delegated account 240 for the purpose of accessing funds that have been deposited in that account by, for example, collecting a percentage of payments for use of ATS vehicles arranged through the system 220 embodying the software architecture 222.

The system operator 244 further has control of the smart contract generation system 242 to allow the creation of ATS smart contracts and/or updating previously created ATS smart contracts as necessary to handle changing operational, legal, and technical factors associated with the execution of the ATS smart contracts.

Figure 4:
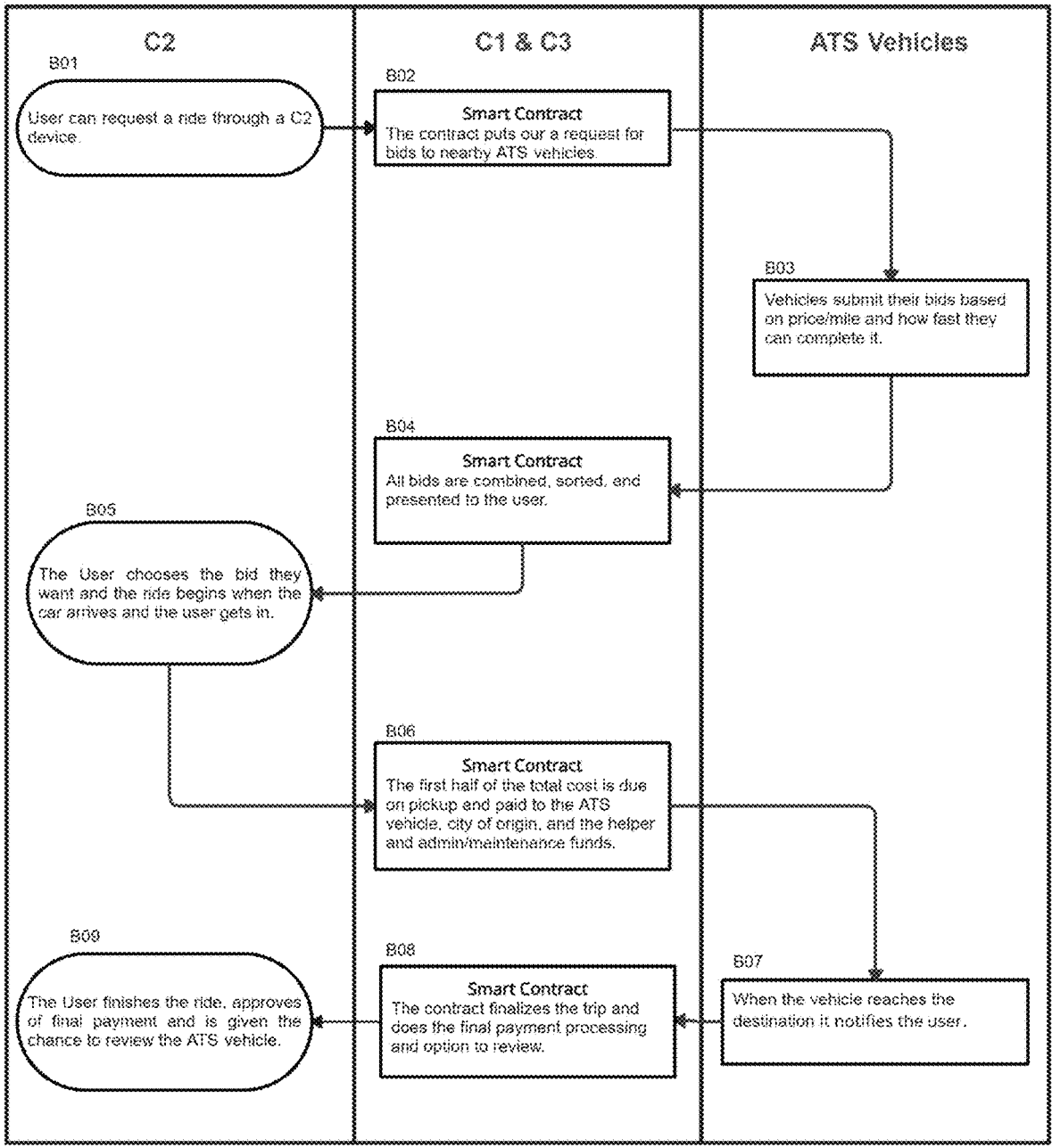
FIG. 4 is a schematic logic diagram illustrating basic operation of the first example autonomous transportation system software architecture.

More specifically, FIG. 4 illustrates an example logic diagram showing basic interaction of the components C1, C2, and C3. In particular, a user requests a ride using a device running the component C2 as shown at step BO1. At step BO2, a Smart Contract puts out a request for bids to ATS vehicles, typically but not necessarily nearby ATS vehicles. At step BO3, ATS vehicles that received the requests for bids submit bid(s) including parameters such as price per mile and time to complete the transportation task bid on. At step BO4, the Smart Contract combines and sorts the bids and presents the bids to the user requesting a ride on the device running component C2. At step BO5, the user selects a winning bid. When the ATS vehicle associated with the winning bid arrives, the user gets in the ATS vehicle and begins the ride. According to the terms of the example Smart Contract, the first half of the total cost is due when the ATS vehicle picks up the user/rider, and, as shown at step BO6, the first half is distributed according to a first predetermined formula to various stakeholders such as the owner of the ATS vehicle, the city in which the ATS vehicle operates, and to the system operator to cover administration and maintenance costs. When the vehicle arrives at the destination at step BO7, the Smart Contract notifies the user, finalizes the trip, and finalizes payment according to a second predetermined formula. The first and second predetermined formulas may be different or the same. Finally, at a step BO8, the user/rider completes the rid and is prompted by the Smart Contract to approve final payment. The user/rider may also be given the opportunity at step BO8 to review the ATS vehicle that provided the ride.

The software components C1, C2, and C3 may thus be configured to cooperate to provide the functions of autonomous Ride-Hailing/Reservation and Delivery workflow with user choice and revenue sharing (see, e.g., FIGS. 5-10). Additionally, the software components C1, C2, and C3 may also be configured to provide the following functional workflows: (1) Loyalty program between the users and

Figure 12:
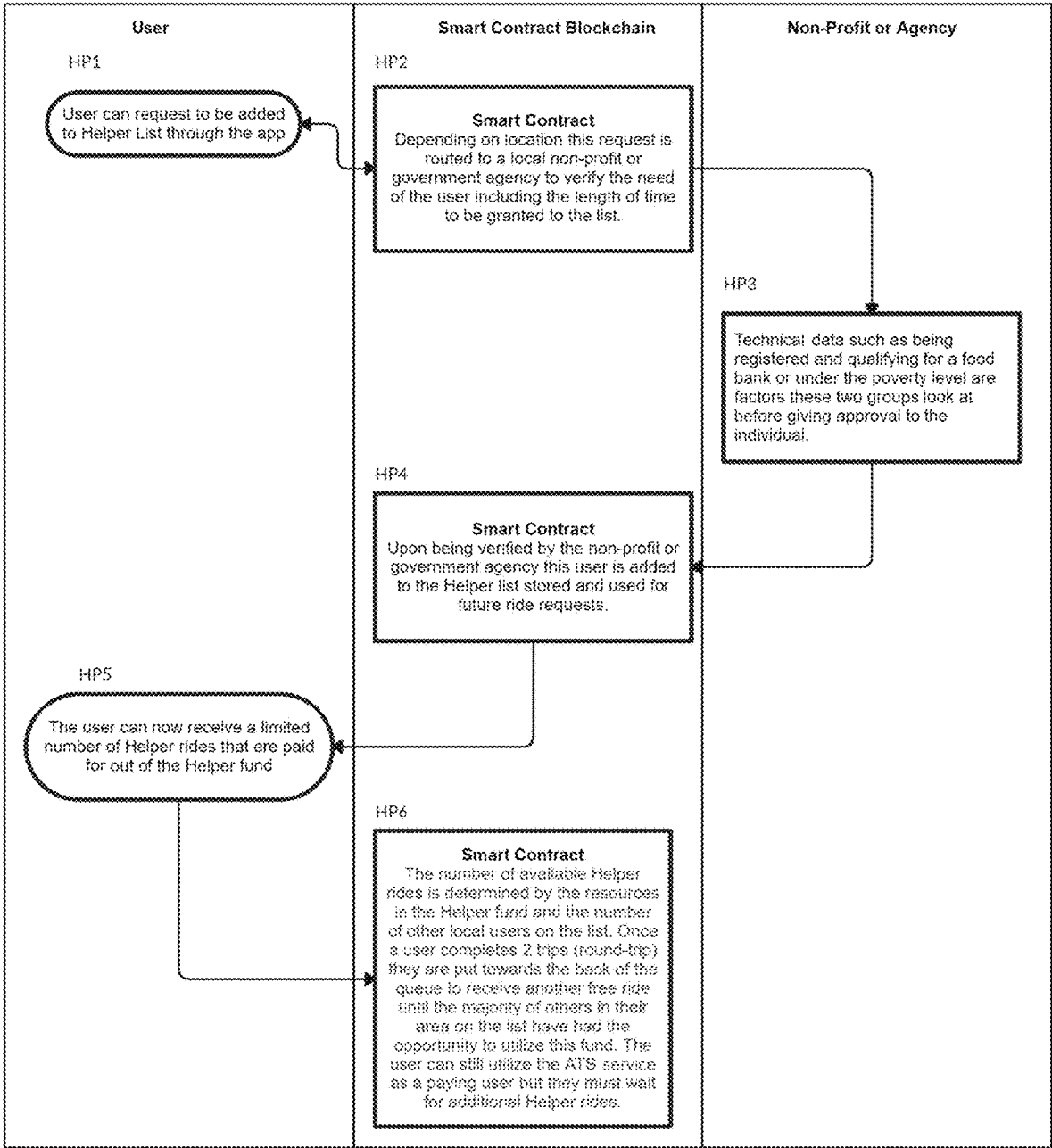
FIG. 12 is a schematic logic diagram illustrating an example helper program workflow method that may be used by any of the example ATS systems or methods of the present invention.

8 advertisers (see, e.g., FIG. 11); and (2) Helper program to assist with users in need (see, e.g., FIG. 12).

Example workflows that may be implemented by the components C1, C2, and C3 are described in further detail below.

Autonomous Ride-Hailing with User Choice and Revenue Sharing

1. User inputs requested destination into a C2 interface (application layer) which is sent to and processed by C1 (backend infrastructure).
2. This event triggers a request to go out from C1 to C3 (vehicle service provider) to all nearby autonomous vehicles that wish to provide a ride. The vehicle service provider provides the avenue for vehicles to respond with an availability (time to pick up) and prices back to C1 which then routes this information and presents it to the general user through a C2 interface.
3. The general user selects their preferred vehicle at that price or utilizes the feature to auto-select their "favorite" vehicle manufacturer and waits for pickup.
4. This triggers another update to go out over C3 to all previous vehicles letting them know their offer was denied and confirmation to the vehicle that was selected.
5. When the vehicle arrives at the specified pick up zone it sends a notification over C3 which is routed by C1 to the general user's C2 interface.
6. When the user gets into the vehicle they confirm their identity, destination and agreed-upon price in C2 which is then transmitted through C1 back to C3 notifying the vehicle manufacturer's vehicle that the trip is verified and ready to start.
7. At this point the ride is stored in C1 and as the ride progresses the location of the vehicle and user are transmitted by either C2 and/or C3 to provide real-time location updates on the ATS map.
8. When the ride begins C1 also retrieves the advertiser associated with the user and projects the advertiser's logo above the vehicle as they move throughout the map en route to their destination which is visible by users viewing the map through a C2 interface.
9. When the vehicle arrives at the destination payment is processed by confirming the identity of the user and their payment type by transmitting this from C2 to C1. C1 then processes the transaction and sends the % due to the vehicle manufacturer over C3. In addition, the remaining % of revenue is sent to the city where the user was picked up as well as the Helper and Application funds.
10. If the user desires to go to a more distant city they can elect to extend their trip with the existing vehicle for a higher rate or use the inter-city feature that looks to link vehicles and buses to provide a linked route where the user is dropped off at a bus station and autonomously transported to the city of choice by bus whereon another autonomous vehicle is queued up to arrive when the autonomous bus arrives to take the user to their final location. A large portion of each ride's revenue will go to the vehicle manufacturer while a smaller portion will be distributed to the city in which the ride was hailed, and the remaining portions will go to the helper and app maintenance funds. An example of this revenue sharing model could be as follows: 90% (vehicle manufacturer), 6% (city), 4% (helper and app maintenance funds). With this model the vehicle manufacturer or owner earns revenue by providing the vehicle, the city earns revenue to provide the roads, and the remaining revenue supports low-income users and helps pay for maintenance of the application. This workflow could be used to transport and deliver products as well as people.

Loyalty Program Between the General Users and Advertisers

1. General User registers an account with the ATS through a C2 interface.
2. At the end of the registration process, they are prompted to select their preferred advertiser.
3. They can search for advertisers and what promotions they offer and when they are ready they select the Advertiser they prefer.
4. This relationship is then saved in C1 for all future sessions for this user. The advertiser is also notified of a new user and the ability to offer promotions based on ride usage.
5. The user can then view their promotions in the loyalty section of the application through a C2 interface in addition to which tier they are in and how many rides they need to complete to attain better promotions in higher ride usage tiers.
6. The Advertiser can also track the number of users that have signed up and can upload new promotions through a C2 interface which will be sent to C1, stored, and then sent out over C2 to their user list via a notification.
7. When a general user takes a ride the Advertiser's logo is shown above their avatar as they proceed on to their destination. At the conclusion of the ride the advertiser's monthly ride count is incremented by 1 and at the end of the month, an invoice is created and processed at C1 and sent to the advertiser for the total rides taken during the month. Instead of presenting targeted ads at users this model involves the individual giving them a choice in who they want to be advertised by. In addition, there is a marketplace of promotions for the user to choose from which creates a competitive atmosphere between the advertisers to attract users. This results in valuable promotions being offered and in return advertisers gain direct contact with their target audience and can build brand loyalty. The advertiser logo is presented next to the user while on the ride to provide visibility for the brand and can lead to other users investigating the advertiser and potentially signing up for their promotions.

Helper Program for Disadvantaged General Users

1. User can request to be added to Helper List through a C2 interface.
2. Depending on location this request is routed to a local non-profit or government agency to verify the need of the general user including the length of time to be granted to the list.
3. Upon being verified by the non-profit or government agency this general user is added to the Helper list stored in C1 and used for future ride requests.
4. The general user can now receive a limited number of Helper rides that are paid for out of the Helper fund (see workflow for Autonomous Ride-Hailing with User Choice and Revenue Sharing).
5. The number of available Helper rides is determined by the resources in the Helper fund and the number of other local users on the list. Once a user completes 2 trips (round-trip) they are put towards the back of the queue (in C1) to receive another free ride until the majority of others in their area on the list have had the opportunity to utilize this fund. The user can still utilize the ATS service as a paying user but they must wait for additional Helper rides. The Helper fund is designed to support those in the community who cannot afford a vehicle/ride. An example: The family that is operating at or below the poverty level and needs to purchase groceries for the family or attend interviews for a higher paying job. The Helper fund is to be utilized as a supporting mechanism to the existing efforts by non-profits and government agencies helping the disadvantaged population. It is also designed to provide fairness of use by all on the list and limit abuse by requiring approving partners to set a time limit for each user approval. These two approving bodies (non-profits and government agencies) can also sign up for business accounts with the ATS allowing them to set aside funds to dedicate to their general user base associated with them. For example, an employee working for a company could use the ATS while on the job and charge the ride to the business's account instead of their individual account. A business account designates a list of general users who can charge their ride against a business account instead of a personal one. In this instance, the user's advertiser is not charged because the business's logo is shown on the ride instead.

II. First Example Autonomous Transportation Method

Figure 5:
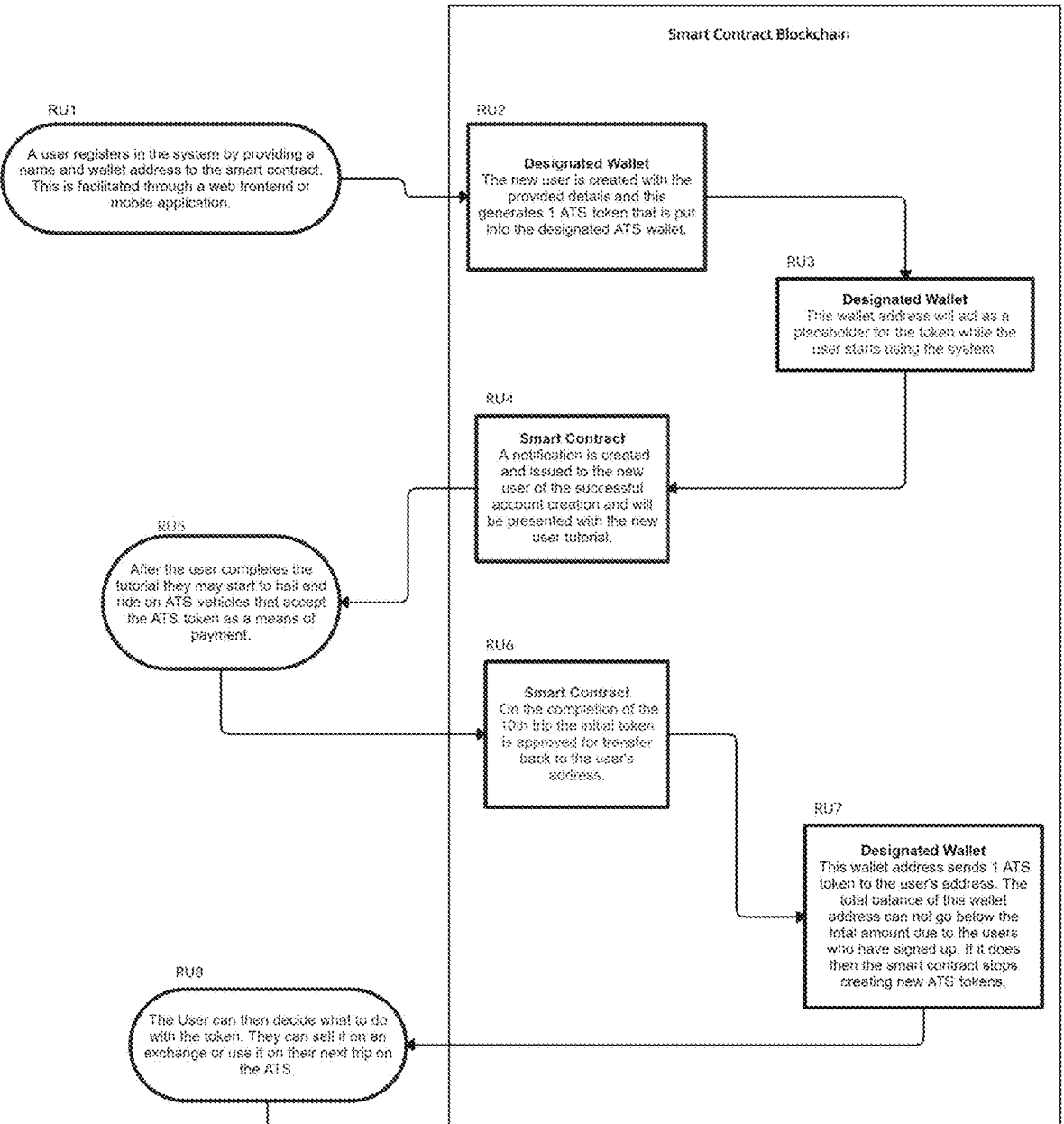
FIG. 5 is a schematic logic diagram illustrating an example user registration method that may be used by any of the example ATS systems or methods of the present invention.
Figure 6:
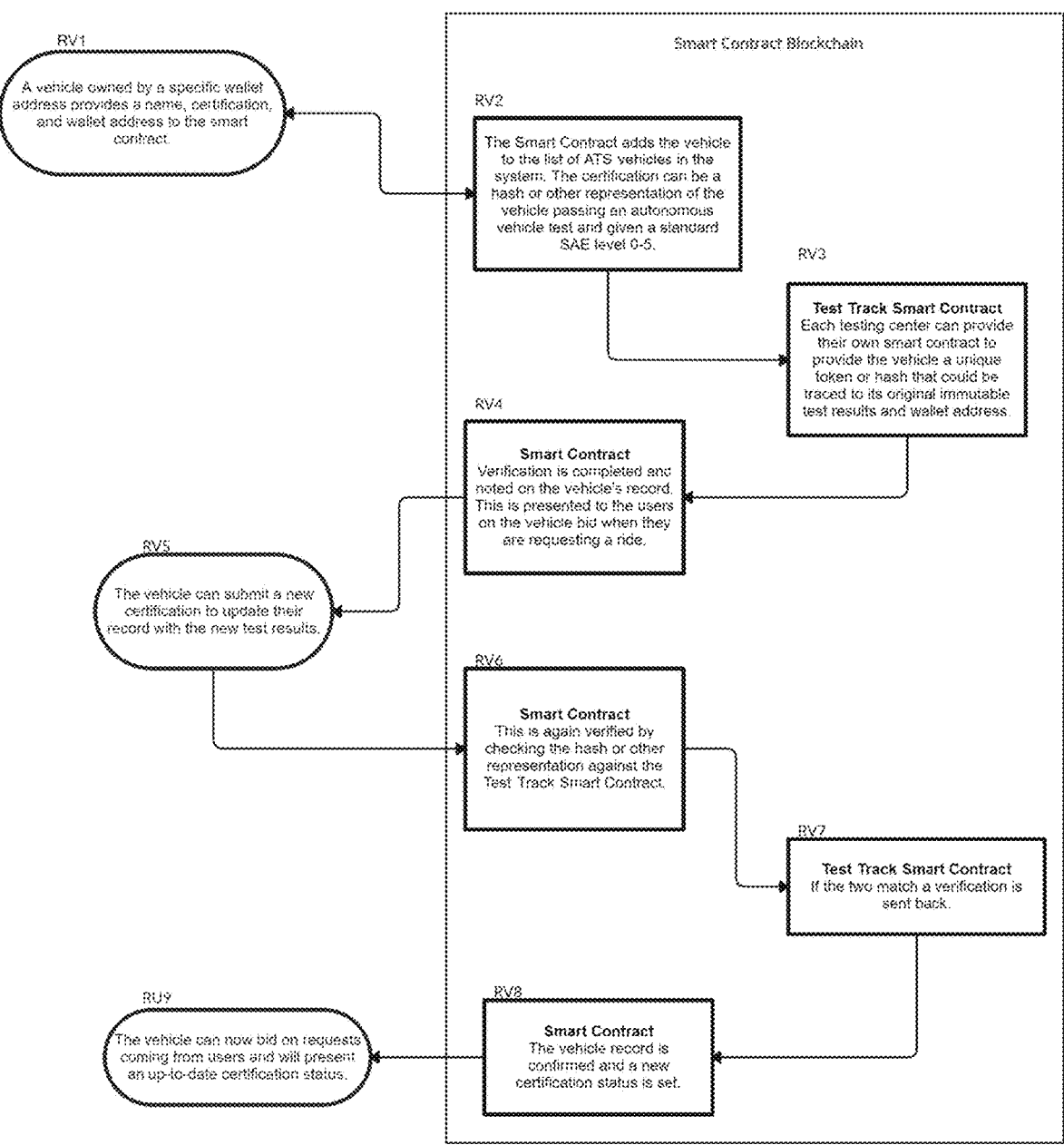
FIG. 6 is a schematic logic diagram illustrating an example vehicle registration method that may be used by any of the example ATS systems or methods of the present invention.
Figure 7:
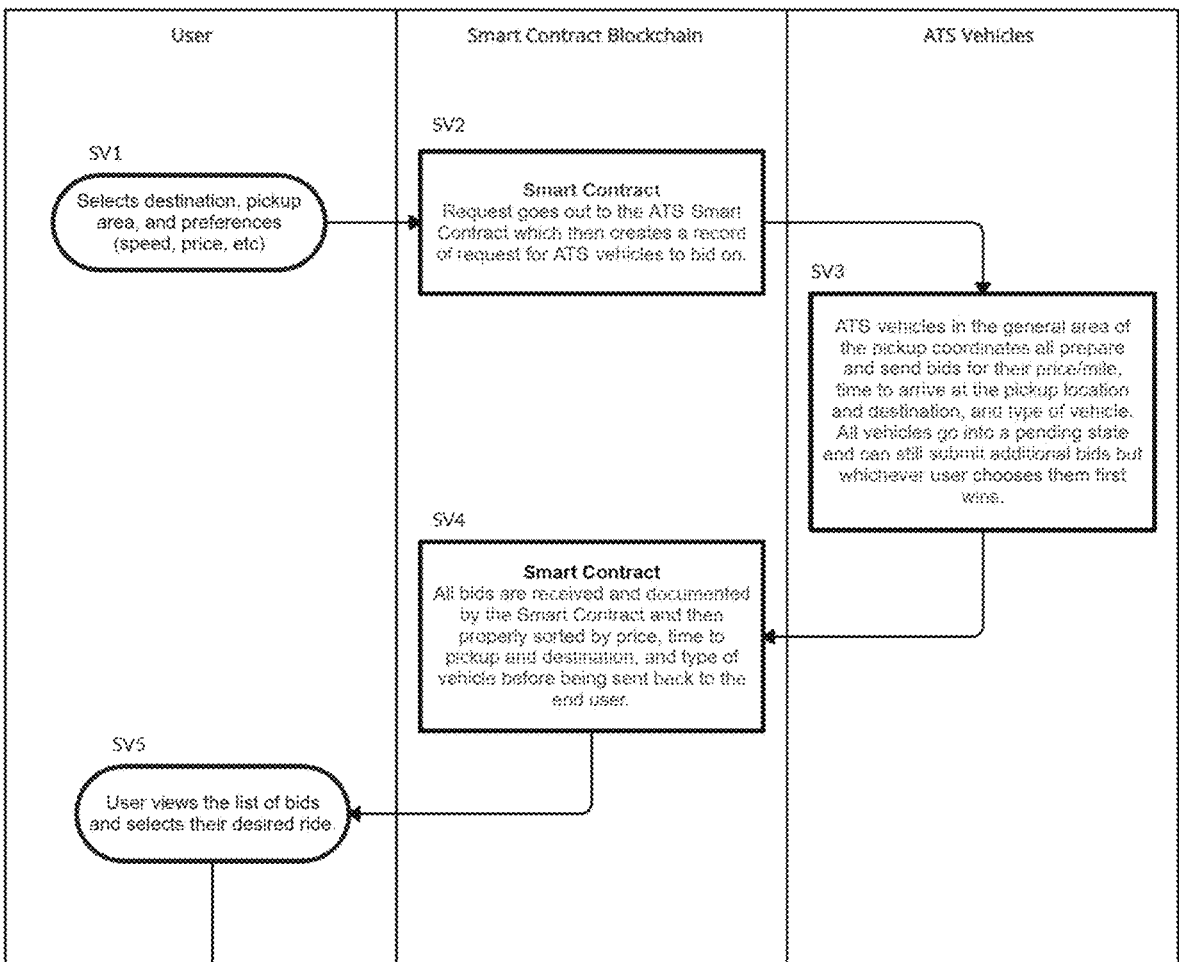
FIG. 7 is a schematic logic diagram illustrating an example vehicle hail method that may be used by any of the example ATS systems or methods of the present invention.
Figure 7:
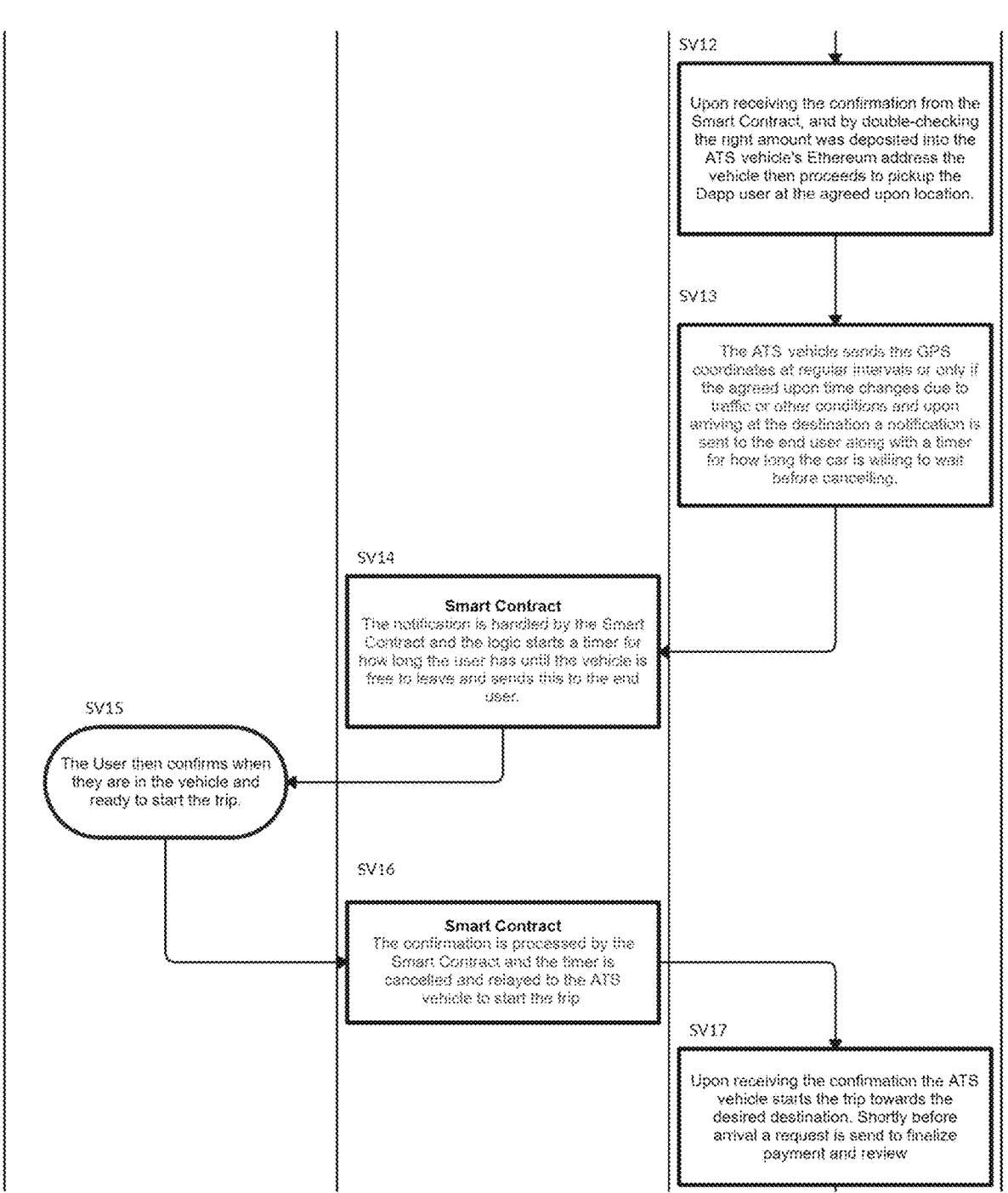
Figure 7:
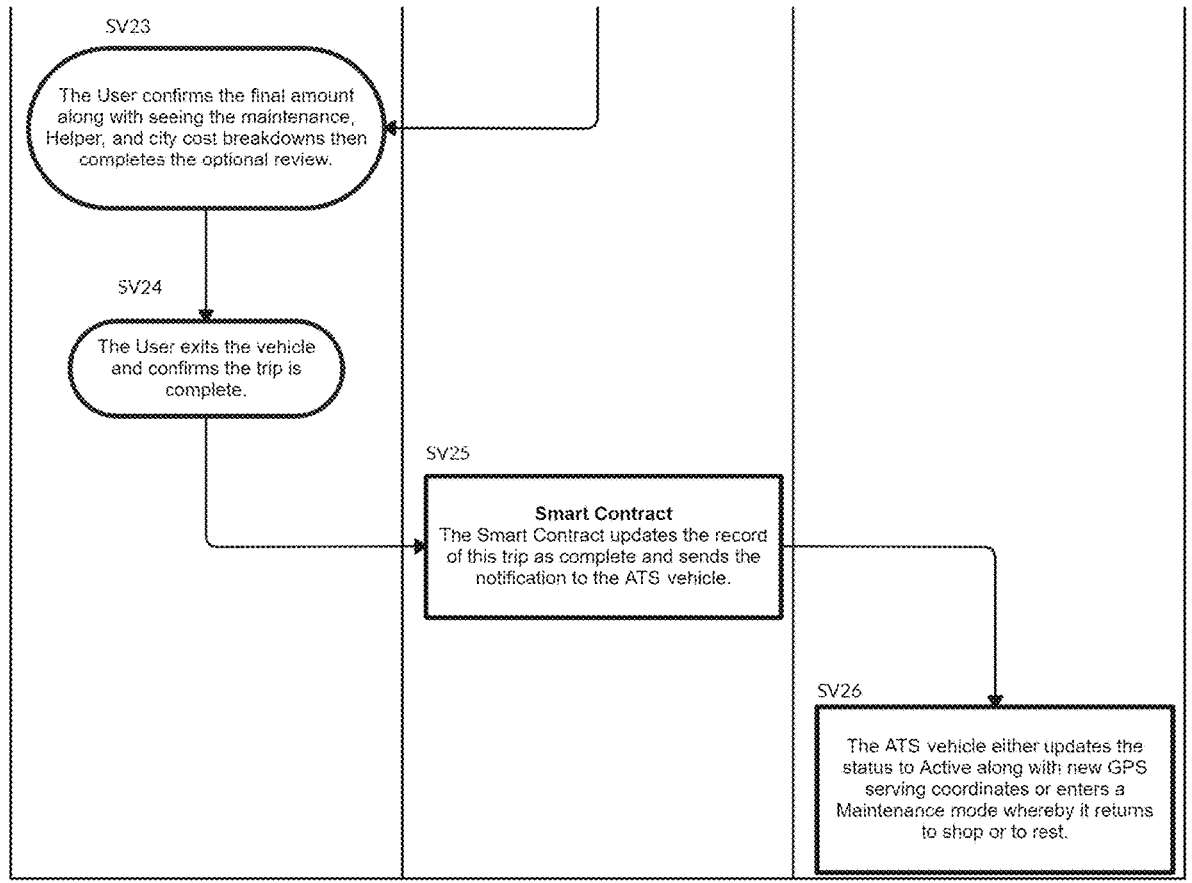

The principles of the present invention may also be embodied as a method of associating at least one vehicle user with at least one vehicle. In particular, each vehicle user first creates a user registration as depicted in FIG. 5 of the drawing. Each vehicle operator initially registers at least one vehicle registration as depicted in FIG. 6 of the drawing. The vehicle operator may be an owner of a registered ATS vehicle or an agent of the owner of a registered ATS vehicle. Once at least one user and at least one vehicle are registered, the registered user may "hail" one or more registered vehicles as depicted in FIG. 7 of the drawing. Each of steps of user registration, vehicle registration, and vehicle hailing will be described in further detail below.

The first example autonomous transportation method of the present invention is implemented using Smart Contract Blockchain technology, and that example of the present invention will be described herein.

A. User Registration

A user registration process is depicted in FIG. 7 of the drawing. Initially, at a step RU1, a user creates a user registration in the ATS by providing a name and blockchain address to the smart contract. User registration may be facilitated through a web frontend or mobile application.

At a step RU2, the new user registration is created with the provided details, and the creation of the new user registration generates 1 ATS token that is put into the delegated ATS blockchain address for the newly registered user. As shown at RU3, the delegated blockchain address acts as a placeholder for the token while the user starts using the system. At step RU4, a notification is created and issued to the new user of the successful account creation and will be presented with the new user tutorial.

As shown at RU5 in FIG. 5, after the user completes a tutorial, the user may start to hail and ride on ATS vehicles that accept the ATS token as a means of payment. At example step RU6, the initial token is approved for transfer back to the user's address on the completion of the 10th trip.

At a step RU7, the blockchain address of the delegated address sends 1 ATS token to the user's address. The total balance of this blockchain address cannot go below the total amount due to the users who have signed up. If it does then the smart contract stops creating new ATS tokens. At step RU8, the user can then decide what to do with the token. They can sell it on an exchange or use it on their next trip on the ATS.

As shown at step RU9, for every subsequent ride on the ATS, the user sends a small portion of the trip cost to the delegated address as a maintenance fee. As shown at step RU10, the maintenance fees can then be used for the upkeep and further development of the application or traded on an exchange.

As shown at step RU11, a new ATS token is created and sent to the blockchain address of the user for every 10th trip. Step RU12 shows that this user can continue using the ATS and receive additional tokens or purchase them from an exchange.

B. Vehicle Registration

The vehicle registration process will now be described with reference to FIG. 7 of the drawing.

As shown at step RV1, a vehicle owned by a specific blockchain address provides a name, certification, and blockchain address to the smart contract. At step RV2, the smart contract adds the vehicle to the list of ATS vehicles in the system. The certification can be a hash or other representation of the vehicle passing an autonomous vehicle test and given the standard SAE level 0-5. As shown at step RV3, each testing center can provide their own smart contract to provide the vehicle a unique token or hash that could be traced to its original immutable test results and blockchain address. At this point as shown at step RV4, vehicle verification is completed and noted on the vehicle's record. This vehicle verification is presented to the users on the vehicle bid when they are requesting a ride.

At step RV5, the vehicle can submit a new certification to update their record with the new test results. At step RV6, the new certification is again verified by checking the hash or other representation against the Test Track Smart Contract. As shown at step RV7, if the new certification matches the Test Track Smart Contract, a verification is sent back.

At step RV8, for every subsequent ride on the ATS, the user sends a small portion of the trip cost to the delegated address as a maintenance fee. At shown at step RV9, the registered vehicle can now bid on requests coming from users and will present an up-to-date certification status.

C. Single Vehicle Hail

The single vehicle hail process will now be described with reference to FIG. 7 of the drawing.

At step SV1, the user selects destination, pickup area, and preferences (speed, price, etc.). At step SV2, a request goes out to the ATS Smart Contract, which then creates a record of request for ATS vehicles to bid on. At step SV3, ATS vehicles in the general area of the pickup coordinates all prepare and send bids for their price/mile, time to arrive at the pickup location, and type of vehicle. All vehicles go into a pending state and can still submit additional bids but a smart contract is established for any vehicle in a pending state that is chosen first.

At step SV4, any and all bids are received and documented by the Smart Contract. The Smart Contract then sorts the bids by factors such as price, time to pickup, and type of vehicle. The sorted bids are then sent back to the end user. At step SV5, the user views the list of bids and selects their desired ride, and a bid confirmation is sent.

At step SV6, the Smart Contract receives the bid confirmation and sends a confirmation code to the selected ATS vehicle and a denied to the others. At step SV7, ATS vehicles that received a denial on their bid are able to change their status back to Active from Pending and continue bidding on additional requests. The denied ATS vehicles may also update their GPS coordinates to a new location to find other requests or less congested areas.

At step SV8, the ATS vehicle that won the bid then changes the status to Transit and sends the confirmation code, time to destination, initial cost, and final cost.

At step SV9, the Smart Contract receives this confirmation, time, and cost and records it. The Smart Contract next prepares the monetary exchange required to allow the user to pay the ATS vehicle by using the native token that was created by and built into the Smart Contract or by using other accepted forms of payment by the ATS vehicle.

At step SV10, the User views the confirmation of time and cost (both the initial half and the full due upon arrival) then, by confirming, initiates the initial token/monetary payment to the ATS vehicle. As shown at step SV11, the token payment goes directly to the public blockchain address supplied by the ATS vehicle while the confirmation code is processed by the Smart Contract and sent to the ATS vehicle. If the monetary payment is not a digital currency, it is converted through an exchange and the fee is included in the ride's total cost.

As shown at step SV12, upon receiving the confirmation from the Smart Contract, and by double-checking the right amount was deposited into the ATS vehicle's blockchain address, the vehicle then proceeds to pickup the user at the agreed-upon location.

At step SV13, the ATS vehicle sends the GPS coordinates at regular intervals while en route or only if the agreed upon time changes due to traffic or other conditions. Upon arriving at the destination, a notification is sent to the end user along with a timer for how long the car is willing to wait before cancelling.

At step SV14, the notification is handled by the Smart Contract and the logic starts a timer for how long the user has until the car is free to leave and sends this to the end user. At step SV15, the User then confirms when they are in the car and ready to start the trip.

At step SV16, the confirmation is processed by the Smart Contract and the timer is cancelled and relayed to the ATS vehicle to start the trip. Upon receiving the confirmation the ATS vehicle starts the trip towards the desired destination as shown at step SV17. Shortly before arrival, a request is send to finalize payment and review.

At step SV18, the Smart Contract processes the event and relays onto the end user the final cost that is due and the option for a review. The Smart Contract verifies each blockchain address for the following: User, ATS vehicle, City of origin, Helper, and App Maintenance Funds are correct and calculates the proper amount to subtract and add for each. At step SV19, the User confirms the final amount along with seeing the fee cost and city cost then completes the optional review.

As shown at step SV20: the Smart Contract confirms each blockchain address was updated and the review is properly stored upon confirmation of payment. At step SV21, the ATS vehicle confirms that the amount credited to the addresses is correct and then, upon arriving at the destination, sends another notification to confirm the trip is complete.

At step SV22, the Smart Contract confirms that the trip is complete and that payment is final and starts a timer for the end user to exit the vehicle and release the vehicle back into the pool of available ATS vehicles.

At step SV23, the User confirms the final amount, along with seeing the maintenance, Helper, and city cost breakdowns, and then completes the optional review. At step SV24, the User exits the vehicle and confirms that the trip is complete.

At step SV25, the Smart Contract updates the record of this trip as complete and sends the notification to the ATS vehicle. At step SV26, the ATS vehicle either updates the status to Active along with new GPS serving coordinates or enters a Maintenance mode whereby it returns to shop, to rest, or to recharge or refuel.

III. Second Example Autonomous Transportation Method

Figure 8:
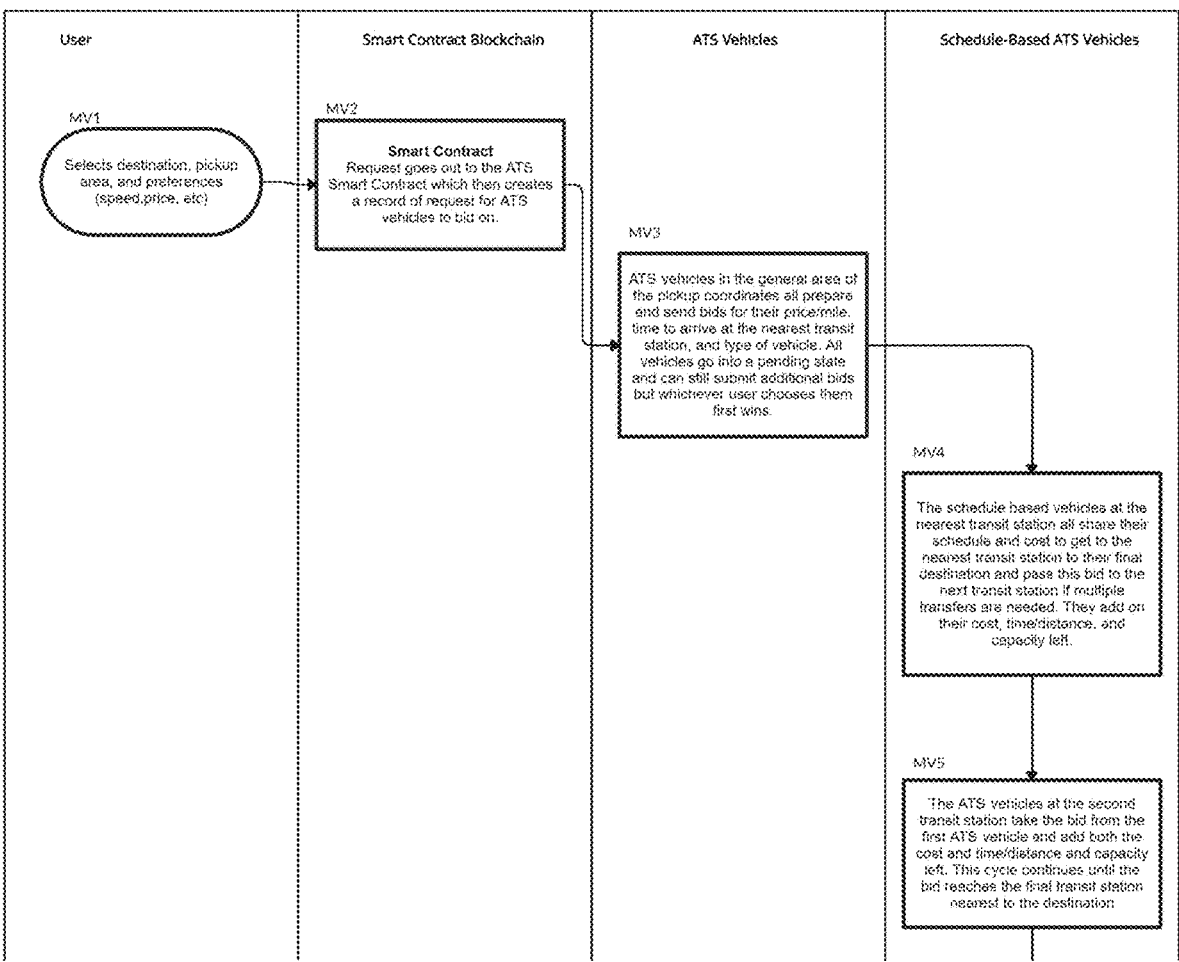
FIG. 8 is a schematic logic diagram illustrating an example vehicle hail method that may be used by any of the example ATS systems or methods of the present invention.
Figure 8:
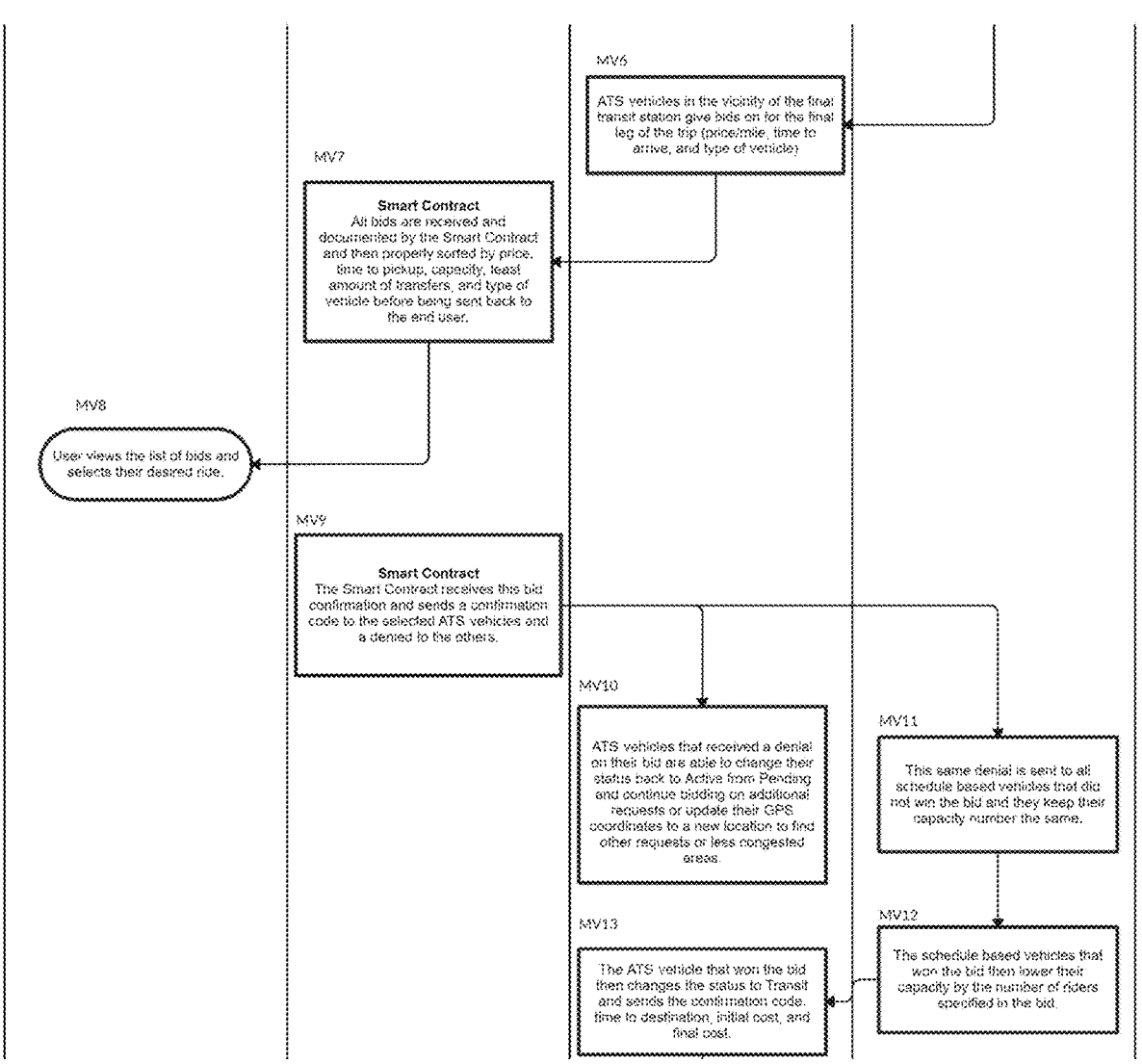
Figure 8:
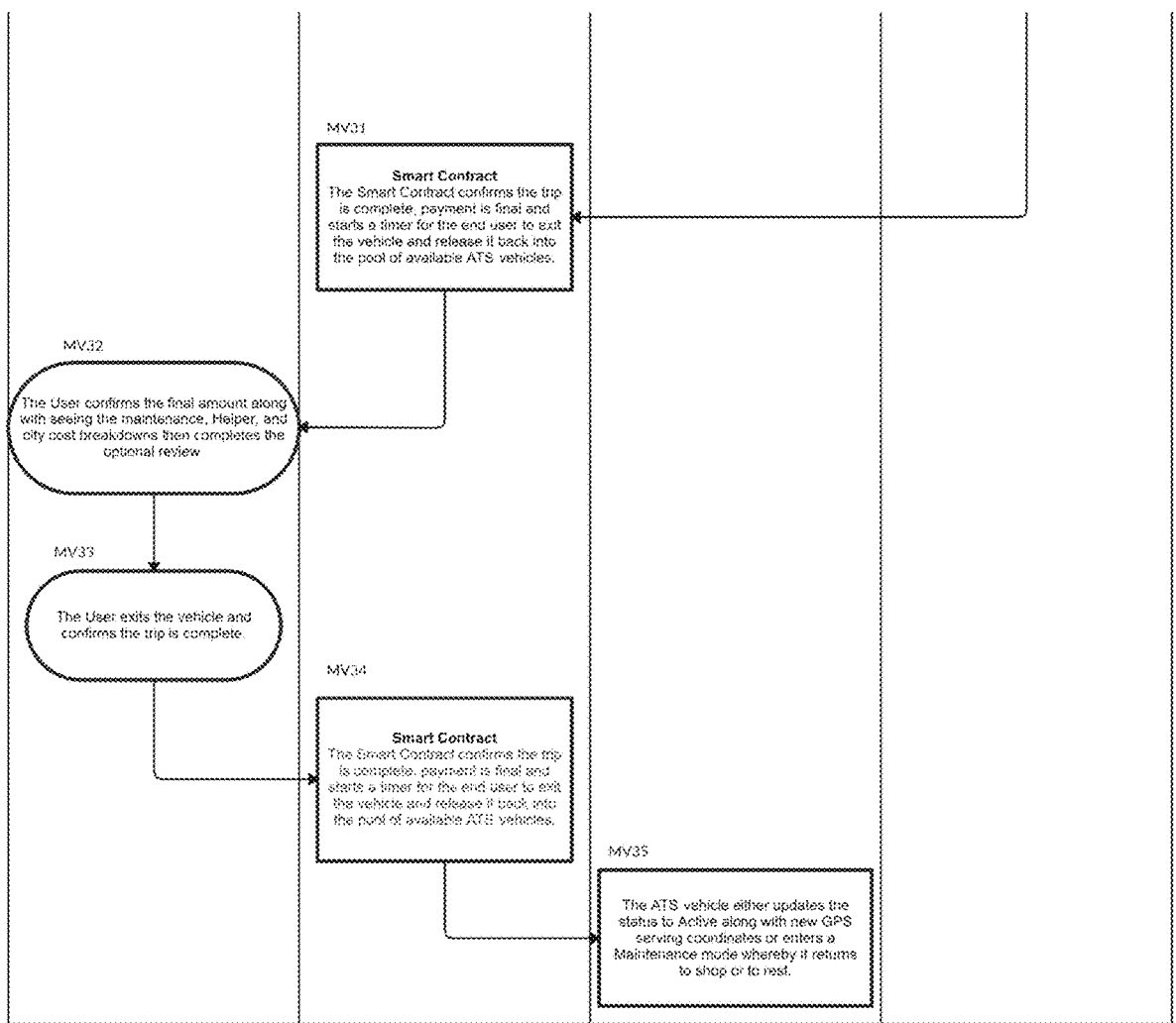

A second example autonomous transportation method comprising multi-vehicle hail process will now be described with reference to FIG. 8 of the drawing. The multi-vehicle hail process of the second example autonomous transportation methods assumes that the user registration and multiple vehicle registrations have already been completed as described above with reference to the first example autonomous transportation method.

At a step MV1, the user selects destination, pickup area, and preferences (speed, price, etc.). At step MV2, a request goes out to the ATS Smart Contract, and the ATS Smart Contract then creates a record of request for ATS vehicles to bid on.

At step MV3, ATS vehicles in the general area of the pickup coordinates all prepare and send bids for their price/mile, time to arrive at the nearest public or private transit station, and type of vehicle. All vehicles go into a pending state and can still submit additional bids but whichever user chooses them first wins.

At step MV4, any schedule based vehicles at the nearest transit station all share their schedule and cost to get to the nearest transit station to their final destination and pass this bid to the next transit station if multiple transfers are needed. Each successive transit station adds on the cost, time/distance, and capacity left for each transit vehicle.

At step MV5, the ATS vehicles at the second (and any successive transit station) take the bid from the first ATS vehicle and add both the cost and time/distance and capacity left. This cycle continues until the bid reaches the final transit station nearest to the destination.

At step MV6, ATS vehicles in the vicinity of the final transit station give bids on for the final leg of the trip (price/mile, time to arrive, and type of vehicle). At a step MV7, all bids are received and documented by the Smart Contract and then properly sorted by price, time to pickup, capacity, least amount of transfers, and type of vehicle before being sent back to the end user.

At step MV8, the User views the list of bids and selects their desired ride or itinerary. At step MV9, the Smart Contract receives this bid confirmation and sends a confirmation code to the selected ATS vehicles and a denied to the others. At step MV10, ATS vehicles that received a denial on their bid are able to change their status back to Active from Pending and continue bidding on additional requests or update their GPS coordinates to a new location to find other requests or less congested areas. At step MV11, this same denial is sent to all schedule based vehicles that did not win the bid and they keep their capacity number the same. At step MV12, the schedule based vehicles that won the bid then lower their capacity by the number of riders specified in the bid.

At step MV13, the initial ATS vehicle that won the bid then changes the status to Transit and sends the confirmation code, time to destination, initial cost, and final cost. At step MV14, the Smart Contract receives this confirmation, time, and cost and records it. Then the Smart Contract prepares the monetary exchange required to allow the user to pay the ATS vehicles by using the native token that was created by and built into the Smart Contract or by using other accepted forms of payment by the ATS vehicle. The User views the confirmation of time and cost (both the initial half and the full due upon arrival) at step MV15 then, by confirming, initiates the initial token/monetary payment to the ATS vehicle.

At step MV16, the token payment goes directly to the blockchain addresses supplied by the ATS vehicles while the confirmation code is processed by the Smart Contract and sent to the ATS vehicles. If the monetary payment is not a digital currency it is converted through an exchange and the fee is included in the ride's total cost.

Upon receiving the confirmation from the Smart Contract at step MV17, and by double-checking the right amount was deposited into the ATS vehicle's blockchain address, the vehicle then proceeds to pickup the user at the agreed-upon location.

At step MV18, the ATS vehicle sends the GPS coordinates at regular intervals or only if the agreed upon time changes due to traffic or other conditions and, upon arriving at the destination, a notification is sent to the end user along with a timer for how long the car is willing to wait before cancelling. At step MV19, the notification is handled by the Smart Contract and the logic starts a timer for how long the user has until the car is free to leave and sends this to the end user.

At step MV20, the User then confirms when they are in the car and ready to start the trip. At step MV21, the confirmation is processed by the Smart Contract, which cancels the timer and relays to the ATS vehicle confirmation to start the trip.

At step MV22, the ATS vehicle starts the trip towards the next transit station upon receiving the confirmation. Upon arrival at the transit station, the user scans or checks into the station and loads on the scheduled ATS vehicle as shown at step MV23. At this point the first ATS vehicle has completed their portion and this is sent to the contract along with the confirmation to the scheduled vehicle that their capacity is accurate for this bid.

At shown at step MV24, if the bid required multiple transit stops, this process will be repeated until arriving at the final transit station. While approaching the final transit station a notice is sent out to the last ATS vehicle in the bid chain to meet at the expected arrival time. If that vehicle is unavailable, a new bid will be presented to the user for the last ATS vehicle.

At step MV25, the same notification and confirmation process is followed as the first ATS vehicle for pickup at the transit station. When the destination is near the vehicle will send an event to the smart contract to finalize the trip. The Smart Contract processes the event at step MV26 and relays onto the end user the final cost that is due and option for a review. The Smart Contract verifies each blockchain address for the following: user, ATS vehicles, City of origin, Helper and App Maintenance Funds are correct and calculates the proper amount to subtract and add for each.

At step MV27, the User confirms the final amount along with seeing the fee cost and city cost for public transit and then completes the optional review. Upon confirmation of payment the Smart Contract confirms at step MV28 that each blockchain address was updated and the review is properly stored.

At step MV29, the ATS vehicle confirms that the amount credited to the blockchain address is correct and then, upon arriving at the destination, sends another notification to confirm the trip is complete.

As shown at step MV30, all schedule based ATS vehicles are also given a function to check that the right amount was credited.

At step MV31, the Smart Contract confirms that the trip is complete, that payment is final, and starts a timer for the end user to exit the vehicle and release it back into the pool of available ATS vehicles. At step MV32, the User confirms the final amount along with seeing the maintenance, Helper, and city cost breakdowns then completes the optional review. The User exits the vehicle and confirms the trip is complete at step MV33.

At step MV34, the Smart Contract updates the record of this trip as complete and sends the notification to the ATS vehicle. At step MV35, the released ATS vehicle either updates the status to Active along with new GPS serving coordinates or enters a Maintenance mode whereby it returns to shop or to rest.

IV. Additional Optional Functions

The basic functions of the ATS systems and methods described herein may optionally be augmented by one or more of the following additional work flows.

A. Example Payment Workflow

Figure 9:
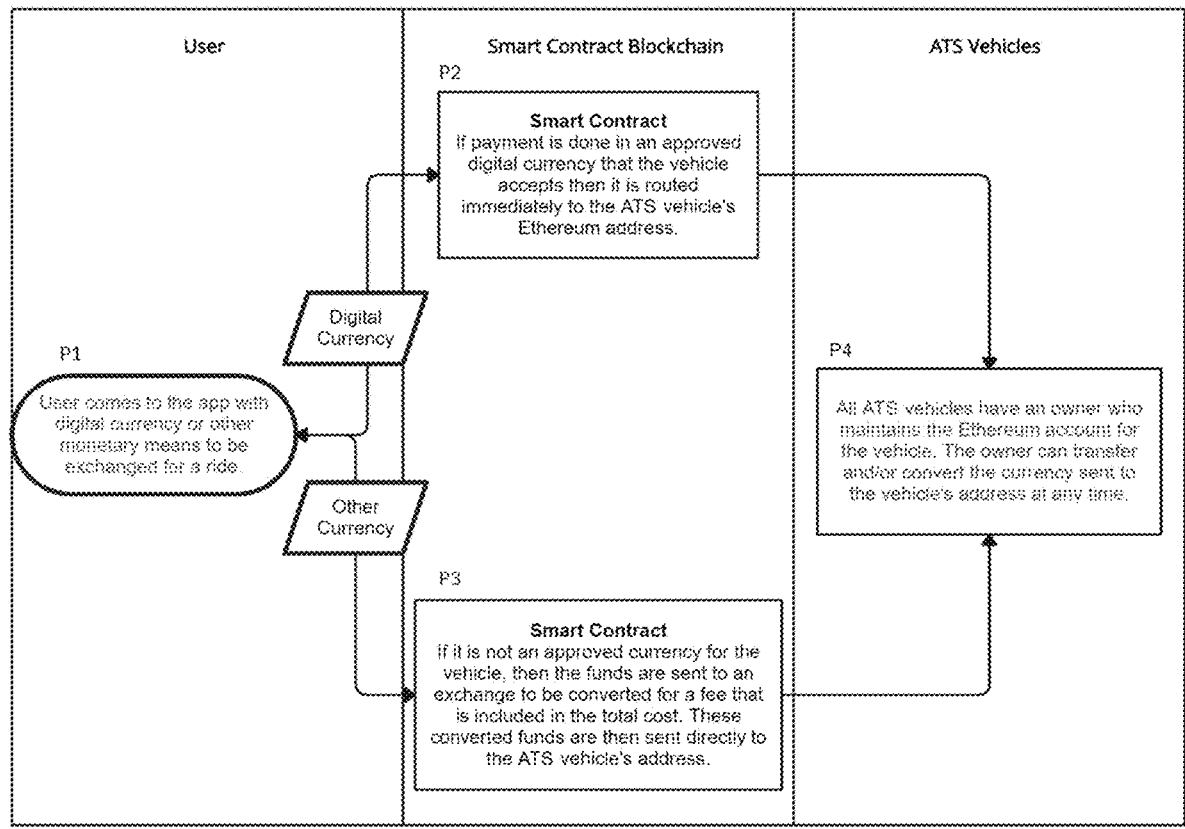
FIG. 9 is a schematic logic diagram illustrating an example payment workflow method that may be used by any of the example ATS systems or methods of the present invention.

FIG. 9 illustrates an example payment workflow that may be implemented by an ATS system or method of the present invention.

Initially, at a step SV1, the user identifies the monetary means used to pay for any ride contracted using the ATS systems or methods of the present invention. If the user elects to use an approved digital currency, the digital currency is routed to the ATS vehicle's Smart Contract Blockchain address as shown at step SV2. If the user elects to use another type of currency (non-digital or non-approved digital), the funds request is sent to a payment system prior to routing of payment to the ATS vehicle's Smart Contract Blockchain address as shown at step SV3. At step SV4, any owner of an ATS vehicle may access currency received as payment using the ATS system or method of the present invention.

Figure 10:
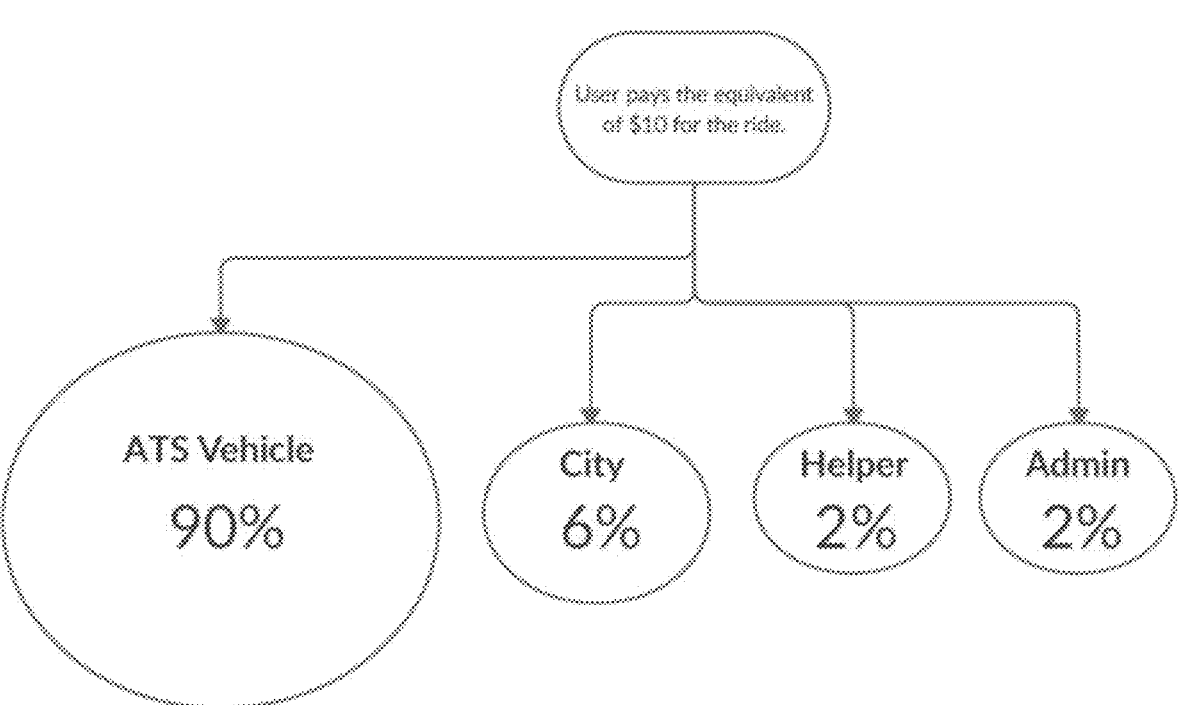
FIG. 10 is a schematic diagram illustrating an example payment breakdown method that may be used by any of the example ATS systems or methods of the present invention.

As generally discussed above, payment may be distributed according to a predetermined payment formula. An example payment formula is depicted in FIG. 10.

B. Example Loyalty Program Workflow

FIG. 11 illustrates an example loyalty program workflow that may be implemented by an ATS system or method of the present invention.

At an initial step LP1, the user registers an account with the ATS system or method. Upon registration, the user is directed to select a preferred advertiser from a predetermined list of ATS advertisers. At a step LP2, the Smart Contract stores the selected preferred advertiser for use during future sessions until the user selects a new preferred advertiser. At a step LP3, the preferred advertiser is notified of the user's preferred advertiser selection. The selected preferred advertiser can offer the user promotions based on various factors such as ride usage or based on inclusion of the user in the preferred advertiser's mailing list. The Smart Contract allows the user to view parameters associated with offers and programs established by the preferred advertiser at step LP4. At step LP5, the user may use any offers earned or otherwise provided by the preferred advertiser. As shown at step LP6, the Smart Contract system displays the preferred advertiser's logo and/or other identifying information and also credits the user's loyalty account with the preferred advertiser as appropriate. At step LP7, the preferred advertiser is allowed to review the user's loyalty account. Any payment due to the system operator is made at Step LP7.

C. Example Helper Program Workflow

FIG. 12 illustrates an example helper program workflow that may be implemented by an ATS system or method of the present invention.

At an initial step HP1, the user can submit a request to be added to a Helper List maintained by the Smart Contract. At step HP2, requests submitted by users are routed to a controlling entity such as a non-profit or governmental agency to verify that the user qualifies for inclusion on the Helper List. At step HP3, the controlling entity determines whether the user qualifies for inclusion on the Helper List and may set one or more time limits limiting the amount of time qualifying users are included on the Helper List. At step HP4, the Smart Contract includes the user in the Helper List. Accordingly, when the user requests a ride at step HP5, the ride may be paid for out of a Helper Fund paid for by other users, owners of ATS vehicles, third parties, non-profits, and/or governmental entities. At a step HP6, the trip is paid for. Optionally, the Smart Contract may ration use of the Helper Fund by limiting access to rides by users on the Helper List. In the example show, the Smart Contract establishes a prioritized list of Helper List users needing ATS services. A Helper List user that recently made use of ride(s) paid for by Helper Funds may be moved to the back of the prioritized list.

D. Example Reward Token Program Workflow

Figure 13:
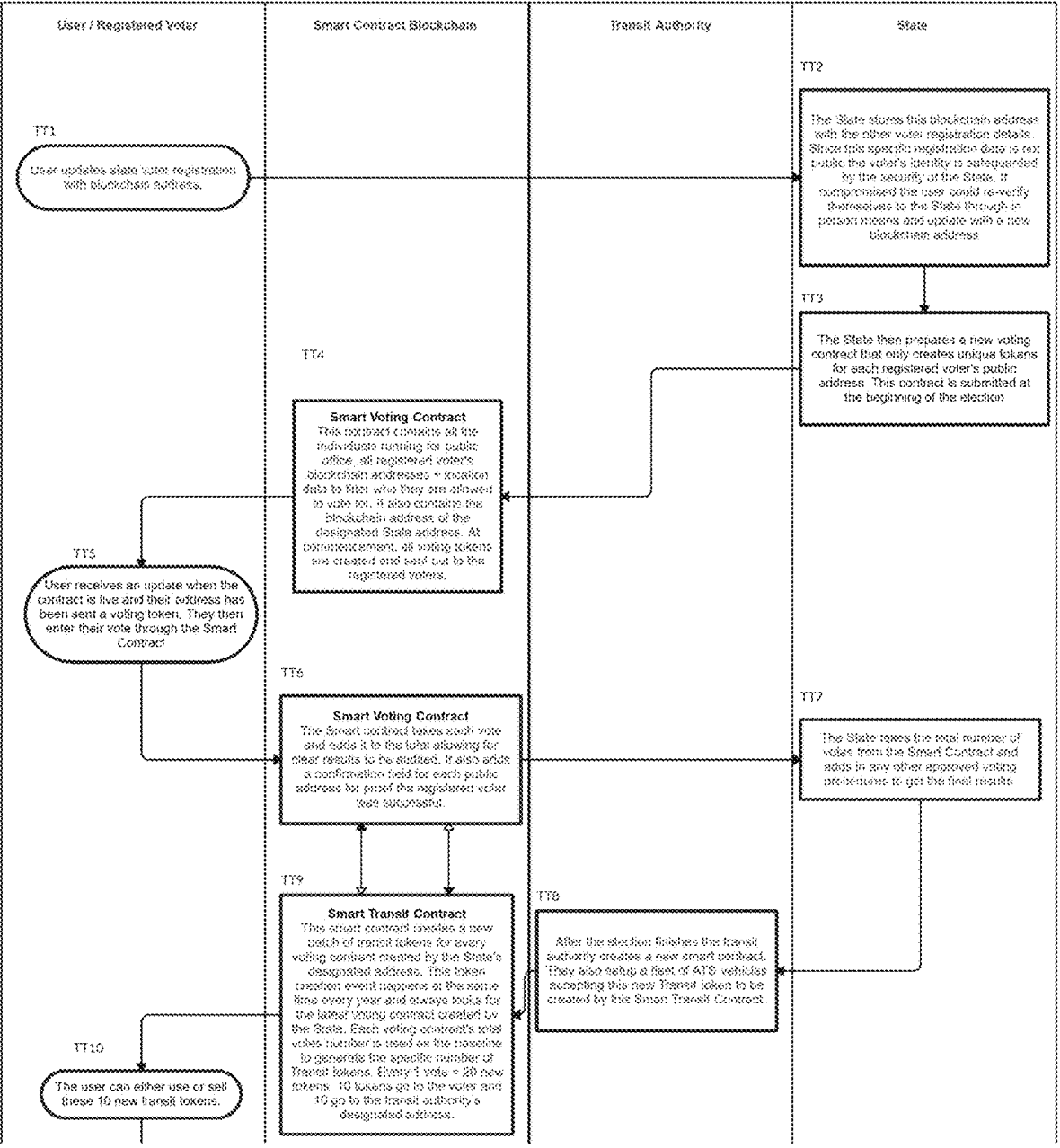
FIG. 13 is a schematic logic diagram illustrating an example token reward program workflow method that may be used by any of the example ATS systems or methods of the present invention.
Figure 13:
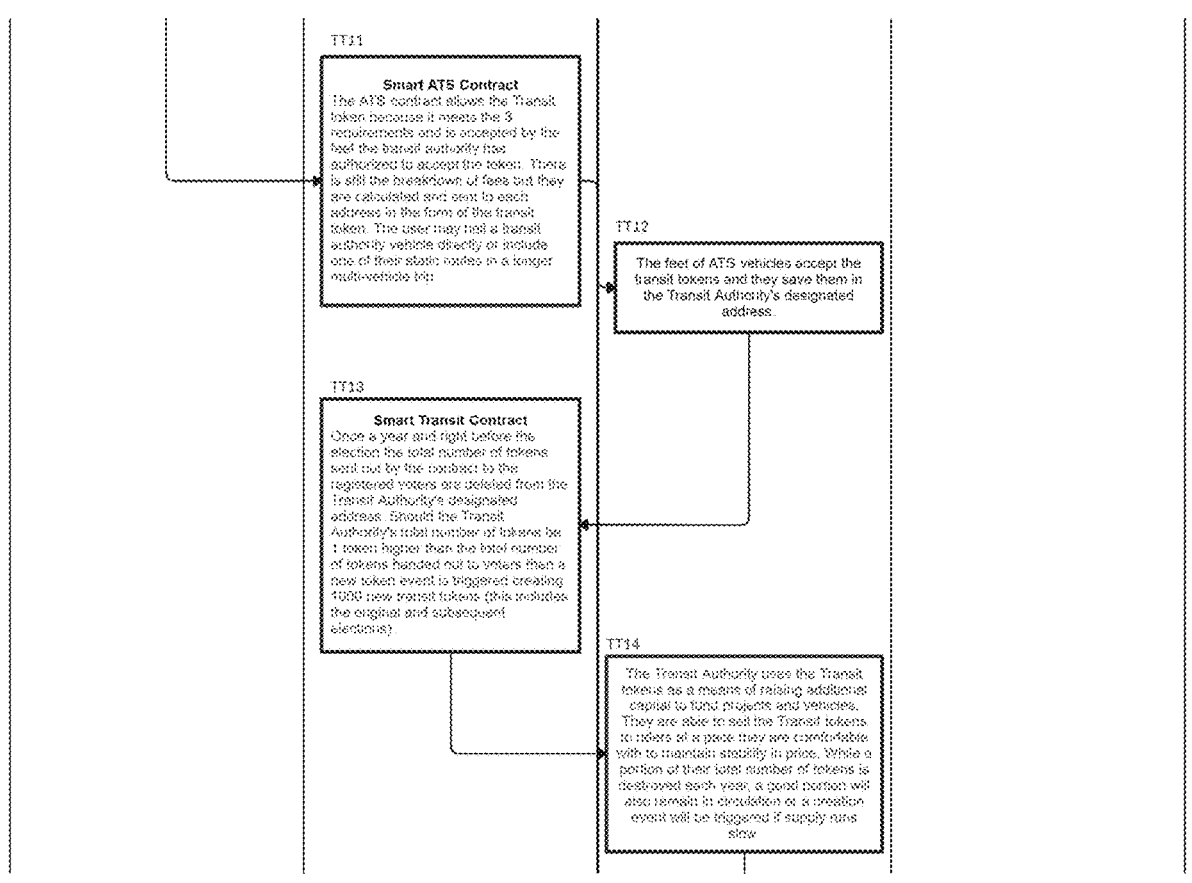
Figure 13:
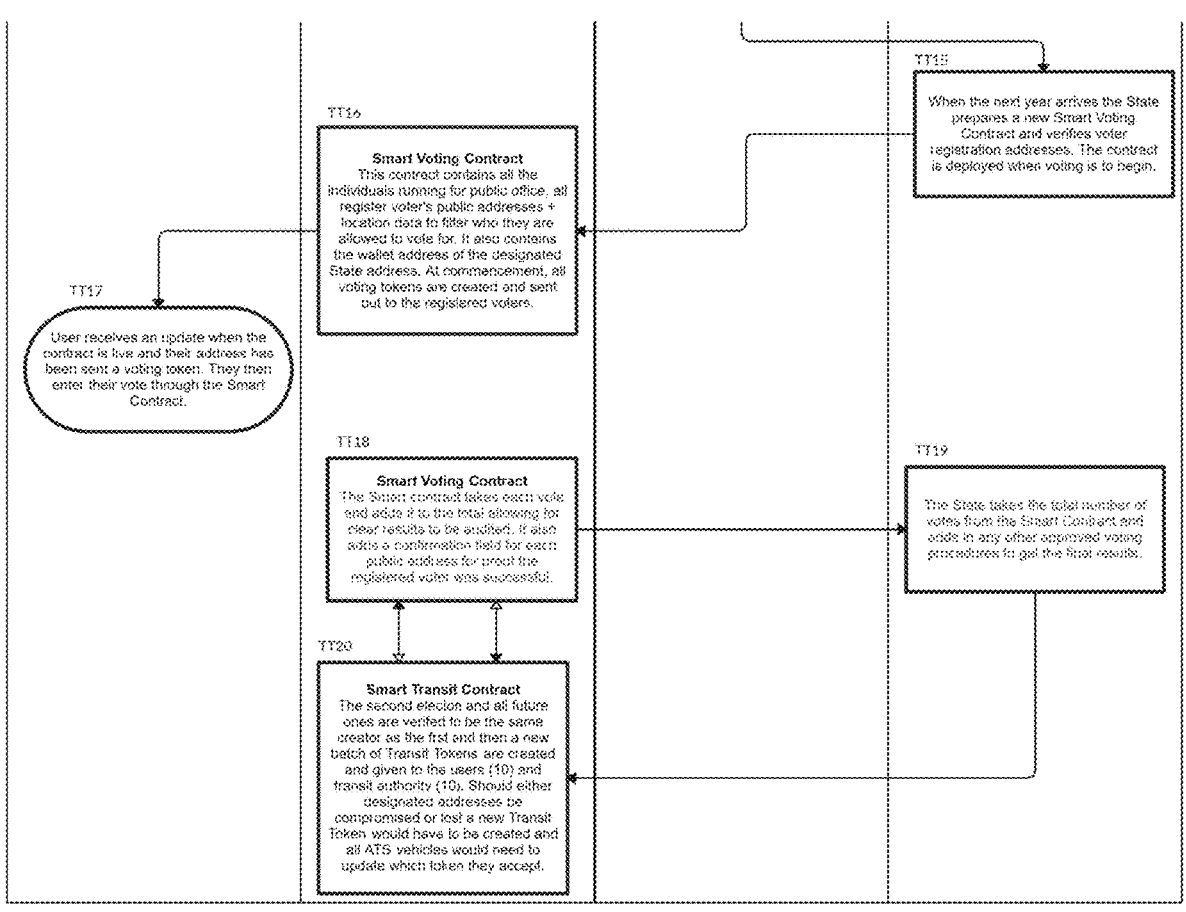
Figure 14:
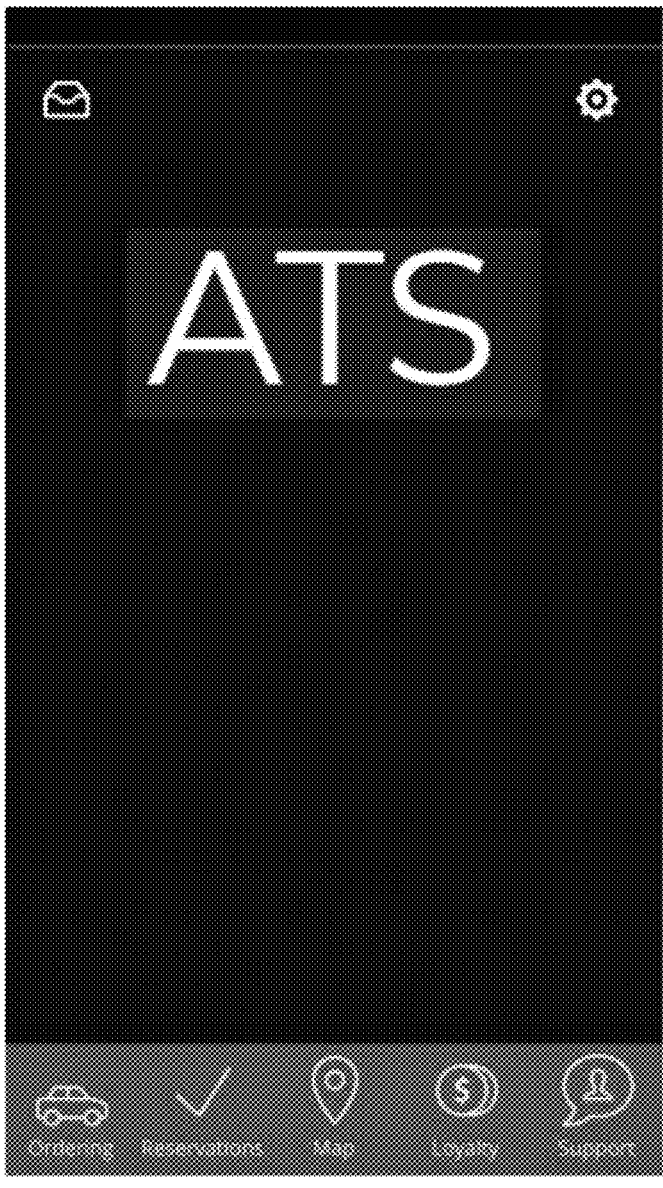
FIG. 14 is an example user interface illustrating an application home page that may be embodied by any of the example automatous transportation systems or methods of the present invention.
Figure 15:
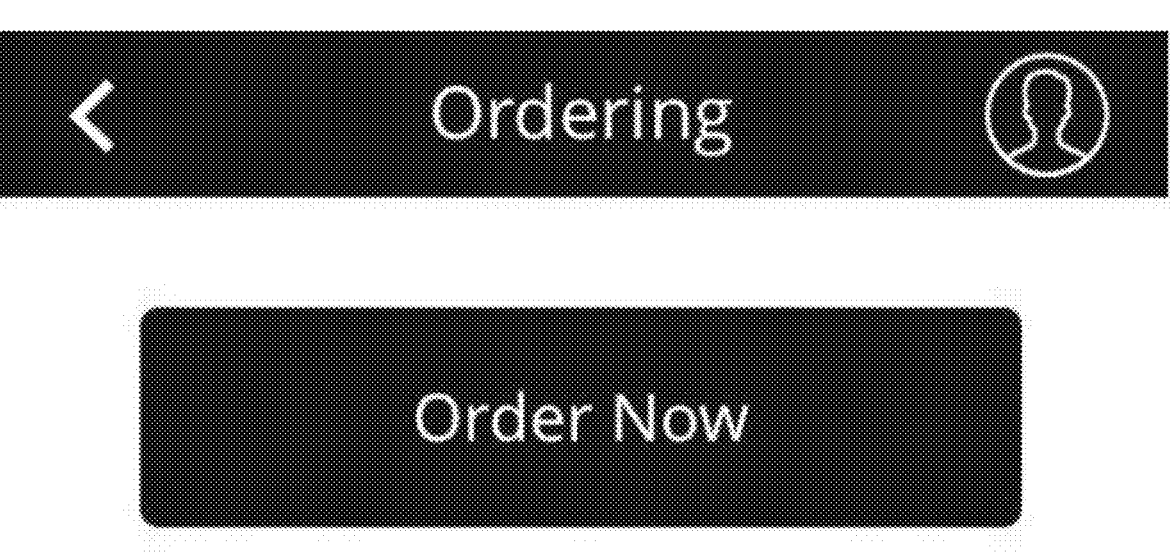
FIG. 15 is an example user interface illustrating an application ordering page that may be embodied by any of the example automatous transportation systems or methods of the present invention.
Figure 16:
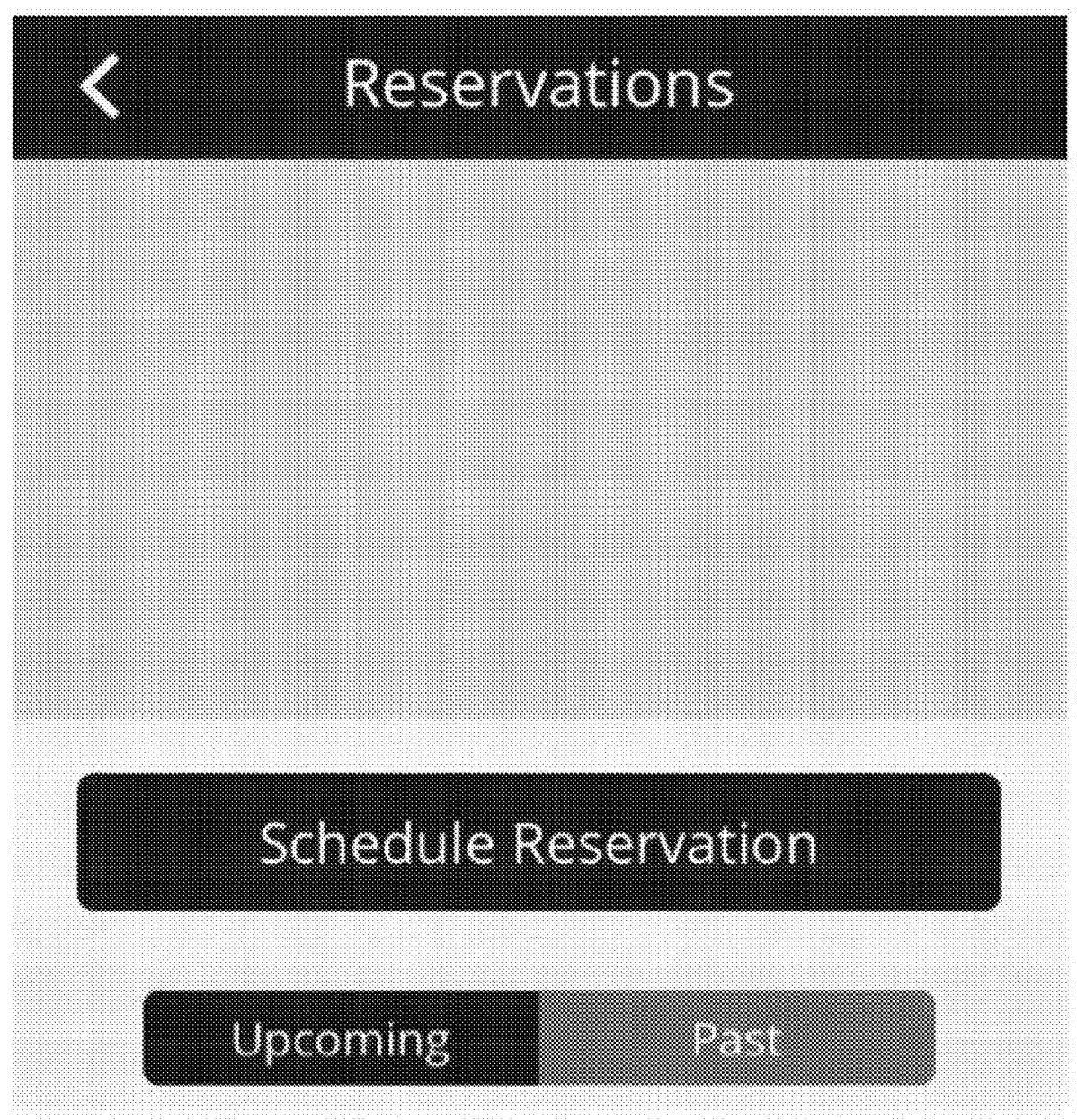
FIG. 16 is an example user interface illustrating an application reservation page that may be embodied by any of the example automatous transportation systems or methods of the present invention.

FIG. 13 illustrates an example token reward program workflow that may be implemented by an ATS system or method of the present invention. The example reward program described in FIG. 13 awards redeemable Transit tokens based on participation by voters in an election. In the example described in FIG. 13, the Transit tokens are issued by a governmental entity such as the state for redemption by one or more ATS vehicle operators/owners such as a public transit authority.

At an initial step TT1, the user updates the user's state voting registration with the blockchain address of their desired account. The state stores this blockchain address with the voter details (address, city, etc.) at a step TT2. At a Step TT3, the state prepares a voting contract that creates a unique token for each blockchain address associated with a registered voter. At a step TT4, the ATS system or method creates a Smart Voting Contract containing voting details and a blockchain address associated with the governmental entity running the election. Voting tokens are then sent to all registered voters who have registered a blockchain address with the governmental entity. At a step TT5, the user receives an update when the Smart Voting Contract is alive, and a voting token is sent to the user's blockchain address. The user can then enter their vote through the Smart Voting Contract.

At step TT6, the Smart Voting Contract receives and tabulates votes. Votes received by the Smart Voting Contract are auditable and immutable. The Smart Voting Contract also updates a confirmation field associated with each user's blockchain address as proof that each vote was successfully received and tabulated. The state takes the total number of Smart Voting Contract tabulated votes and combines those vote totals with votes from other approved voting procedures to determine final voting results at step TT7. At step TT8, the transit authority creates a new Smart Transit Contract shown at TT9. The new Smart Transit Contract generates a number of transit tokens based on a relationship to votes and distributes the tokens to the transit authority and the voter as predetermined.

At step TT10, the user can use or sell any transit tokens awarded by the Smart Transit Contract at step TT9. In particular, the Smart ATS Contract determines whether the transit token is allowed by comparing the transit token with predetermined requirements at step TT11. If allowed, the user may hail a transit authority vehicle and redeem the transit tokens as shown at step TT12.

At step TT13, the Smart Voting Contract is updated according to a predetermined schedule. At step TT14, the transit authority may use transit tokens as a means of raising capital, and new tokens may be created upon a creation event meeting the requirements of the Smart Voting Contract. A new Smart Voting Contract may be established by the governmental authority at step TT15 each voting cycle for deployment when voting begins. At shown at step TT16, the newly created Smart Voting Contract determines voting parameters and sends voting tokens as appropriate. At step TT17, the use receives notification that the new Smart Voting Contract is live and allowed to vote. The Smart Voting Contract receives and tabulates each vote at step TT18, and the state tabulates Smart Voting Contract votes with other legitimately cast votes to determine final results at step TT19. At step TT20, the new Smart Transit Contract generates a number of new transit tokens based on a relationship to votes and distributes the tokens to the transit authority and the voter as predetermined.

V. Additional Considerations

The present invention may thus be embodied as an autonomous ride-hailing and delivery service platform with revenue sharing for autonomous vehicle manufacturers, users, advertisers, businesses, non-profits, and government entities. As shown in FIG. 3, C1 is the backend infrastructure that provides all of the storage, networking, backend processing, and security required to sustain the novel features and services presented by the other components C2 and C3.

C2 is the application layer that is defined by any interface (mobile app, web app, VR app, etc.) that the general user, advertiser, business, non-profit, and/or government entity interacts with the ATS. C3 is a service provider/API that integrates into the various vehicle manufacturing systems and vehicles.

Revenue may be shared between autonomous vehicle manufacturers and/or owners, cities, and the Helper and App maintenance funds.

A loyalty program may be established between the users and advertisers. The loyalty program may be incorporated to replace traditional targeted-ads with user-chosen advertisers supplying promotions ranging on the user's ride usage. Visibility of the advertiser's logo will be associated with or on each user's ride. The advertiser pays a small charge to the app owner for each ride usage by its users.

A helper program for disadvantaged general users may be incorporated to allow the system to support those in the community who cannot afford a vehicle/ride. In this case, rides may be provided to those individuals who are approved by an authorized third party such as a non-profit or government entity and only for a specified length of time. Once a user completes two free or reduced price trips (round-trip), the user is put towards the back of the queue (in C1) to receive another paid ride until the majority of others in their area on the list have had the opportunity to utilize this fund. Helper ride availability is dependent upon the resources available in the program and frequency of use by the general user. The helper program may be funded by a small percentage of each ATS ride being set aside for this purpose.

VI. Summary of Benefits of Example Autonomous Transportation Systems and Methods The ATS systems of the present invention are thus capable of seamlessly providing both intra-city and inter-city transportation. Further, multiple types of vehicles from multiple vehicle operators can be used in a linked structure to complete longer or more complex trips between cities. Alternatively, an individual vehicle could complete the trip as well depending on what the user chooses. For example, a user could ride an autonomous vehicle to a bus station where an autonomous bus takes them to another city where a final autonomous vehicle takes them to their final destination. These vehicles could all be provided by different vehicle manufacturers and owned by different vehicle operators but would be unified by the scheduling portion of ATS systems of the present invention.

Further, the exact schedule of one or more vehicles may be adjusted depending on the amount the user is willing to pay. If the user preferred to ride only one vehicle, the user could pay the higher cost of taking a single vehicle the entire distance.

In addition, the ATS systems of the present invention are not limited to transporting users. ATS systems of the present invention can also be utilized as a delivery service by which the user places their package in a secure container after selecting their preferred vehicle and pays for the transit of the package to the destination.

Additionally, the ATS systems of the present invention provide the user a novel advertising experience with the ability to select a chosen advertiser. A chosen advertiser is defined as any approved entity doing promotions to participating users within the application and advertising their logo on rides. In addition to providing general users vehicle choice, a built-in loyalty service may be made available to users and advertisers. Online and in-app advertising may be implemented by tracking a user and selecting ads based on what services or products the user might like to buy. While this is effective it does not give the user much choice apart from selecting ads they wish not to see. A loyalty program implemented by the ATS systems of the present invention may thus be user-driven. When the user selects an advertiser, the user unlock promotions provided by that advertiser.

Finally, the ATS systems of the present invention can be configured to set aside a small percentage of each ride's revenue into a "Helper" fund which provides free transportation to approved users who cannot afford to use the ATS.

This invention also allows any autonomous vehicle manufacturer or owner to integrate or register their vehicle or vehicles into the ATS so the userbase can hail a registered vehicle if the registered vehicle is within physical proximity. This allows the manufacturer access to a userbase while also providing a stable application for them to sell their vehicle service at a price they choose.

The ATS systems of the present invention in turn provides the user with a one-stop-shop to compare vehicle availability and cost within a single application. While conventional ride-sharing applications provide users with choice when it comes to the general type of service vehicle (low-end vs high-end), the ATS systems of the present invention allow a user to see different vehicle models and their varying prices as well as set a standard "favorite" manufacturer.

What is claimed is:

1. An autonomous transportation system for allowing a plurality of end users to arrange for use of and, using an external currency exchange system, pay for a plurality of vehicles operated by at least first and second vehicle operators, where at least one of the first and second vehicle operators operates at least one vehicle according to a vehicle schedule, the autonomous transportation system comprising:

at least one end user device associated with each end user;

at least one vehicle device associated with each of the first and second vehicle operators;

at least one smart contract blockchain system comprising at least one ledger stored on at least one blockchain node; and at least one smart contract stored and processed by the at least one smart contract blockchain system; wherein the at least first and second vehicle devices are configured to allow the first and second vehicle operators to input and transmit vehicle registration parameters to the at least one smart contract blockchain system such that at least first and second vehicles associated with the at least first and second vehicle operators are assigned to a vehicle smart contract stored at a vehicle blockchain address based on the vehicle registration parameters;

the at least one end user device is configured to allow a first end user of the plurality of end users to enter bid parameters associated with a desired trip, where the bid parameters include at least a trip itinerary including an origin point, a destination point, and an arrival time, and transmit the bid parameters associated with the desired trip to the at least one smart contract blockchain system;

the at least one smart contract blockchain system generates a bid request within each vehicle smart contract and displays the bid request to the at least first and second vehicle operators;

based on the bid request, the at least first and second vehicle operators are prompted to, by the first and second vehicle devices, enter a set of vehicle parameters associated with each vehicle and vehicle operator, including a vehicle price and a predetermined vehicle schedule, and transmit each set of vehicle parameters to the bid request;

the at least one smart contract blockchain system compares the bid parameters associated with the desired trip to each set of vehicle parameters, generates at least one trip bid defined by the bid parameters, where the at least one trip bid includes at least one ride in at least one vehicle operated by the first vehicle operator, and at least one ride in at least one vehicle operated by the second vehicle operator according to the predetermined vehicle schedule associated with at least one vehicle operated by the second vehicle operator, and transmits the at least one trip bid to the at least one end user device associated with the first end user;

the end user device associated with the first end user further allows the first end user to generate an accepted bid by accepting the at least one trip bid transmitted to the at least one end user device associated with the first end user, and transmit the accepted bid to the at least one smart contract blockchain system such that the accepted bid is stored on the at least one ledger; and the at least one smart contract blockchain system notifies the first and second vehicle operators of the accepted bid to allow the first end user to take the desired trip, and upon conclusion of the desired trip associated with the accepted bid, interfaces with the external currency exchange system such that the at least one smart contract blockchain system causes the external currency exchange system to distribute payment to the vehicle blockchain address associated with the vehicle operator that received the accepted bid.

2. An autonomous transportation system as recited in claim 1, in which the trip comprises a plurality of trip legs, where the first and second vehicle operators each operates at least one vehicle for one of the plurality of trip legs.

3. An autonomous transportation system as recited in claim 2, in which at least one of the plurality of vehicles is operated by a third vehicle operator and at least a third vehicle device is associated with the third vehicle operator, whereby the at least one trip bid comprises a combined bid arranged by a combination of at least two of the first, second, and third vehicle operators, in which the combined bid is associated with at least two legs of the trip.

4. An autonomous transportation system as recited in claim 1, in which the first vehicle operated by the first vehicle operator is unscheduled.

5. An autonomous transportation system as recited in claim 1, in which at least the second vehicle operator is a public transportation authority.

6. An autonomous transportation system as recited in claim 1, in which at least the second vehicle operator is a private transportation authority.

7. An autonomous transportation system as recited in claim 1, in which the at least one smart contract blockchain system directs the currency exchange system to coordinate transfer of payment in cryptocurrency from the first end user to the first and second vehicle operators according to the accepted bid.

8. An autonomous transportation system as recited in claim 1, in which:

the bid parameters associated with the at least one trip bid presented to the first end user comprises at least one desired currency; and the at least one smart contract blockchain system directs the currency exchange system to coordinate transfer of payment in the desired from the first end user to the first and second vehicle operators according to the accepted bid.

9. An autonomous transportation system as recited in claim 1, in which:

the end user devices are configured to allow the end users to identify at least one preferred advertiser as part of the bid parameters; and the at least one smart contract blockchain system includes at least one preferred advertiser identified by the first end user as part of the at least one trip bid transmitted to the at least one end user device associated with the first end user.

10. An autonomous transportation system as recited in claim 1, in which a percentage of the payment distributed pursuant to the accepted bid is deposited in a helper fund, where the helper fund provides end users with the ability to qualify for payment assistance.

11. An autonomous transportation system as recited in claim 1, in which the at least one smart contract blockchain system stores a helper list of end users qualified for payment assistance from a helper fund; and the at least one end user device allows the first end user to elect to user payment assistance if the first end user is included in the helper list.

12. An autonomous transportation system as recited in claim 1 in which, if the first end user is determined to be eligible by a reward token program, at least a portion of the payment distributed pursuant to the accepted bid is made pursuant to the reward token program.

13. An autonomous transportation system as recited in claim 1, in which at least a portion of the payment distributed pursuant to the accepted bid is in the form of a public transit token associated with a government established cryptocurrency.

14. An autonomous transportation system as recited in claim 1, in which the set of vehicle parameters associated with at least one of the plurality of vehicles includes at least one of vehicle type, vehicle manufacturer, vehicle capability, vehicle availability, vehicle service schedule, vehicle repair schedule.

15. An autonomous transportation system as recited in claim 1, in which a percentage of the payment distributed pursuant to the accepted bid is deposited in a delegated account accessible by an operator of the autonomous transportation system.

16. A method of allowing a plurality of end users to arrange for use of and, using an external currency exchange system, pay for a plurality of vehicles operated by at least first and second vehicle operators, where at least one of the first and second vehicle operators operates at least one vehicle according to a vehicle schedule, the method comprising the steps of:

providing at least one end user device associated with each end user;

providing at least one vehicle device associated with each of the first and second vehicle operators;

providing at least one smart contract blockchain system comprising at least one ledger stored on at least one blockchain node;

establishing at least one smart contract using the at least one smart contract blockchain system;

configuring the at least first and second vehicle devices to allow the first and second vehicle operators to input and transmit vehicle registration parameters to the at least one smart contract blockchain system;

assigning, by the at least one smart contract blockchain system, at least first and second vehicles associated with the at least first and second vehicle operators to a vehicle smart contract stored at a vehicle blockchain address based on the vehicle registration parameters;

causing the at least one end user device to prompt a first end user of the plurality of end users to enter bid parameters associated with a desired trip, where the bid parameters include at least a trip itinerary including an origin point, a destination point, and an arrival time, and transmit the bid parameters associated with the desired trip to the at least one smart contract blockchain system;

generating, by the at least one smart contract blockchain system, a bid request within each vehicle smart contract and displaying the bid request to the at least first and second vehicle operators;

prompting, by the at least first and second vehicle devices, based on the bid request associated with the desired trip, the at least first and second vehicle operators to enter a set of vehicle parameters associated with each vehicle and vehicle operator, including a vehicle price and a predetermined vehicle schedule, and transmit each set of vehicle parameters to the bid request, causing the at least one smart contract blockchain system to compare the bid parameters associated with the desired trip to each set of vehicle parameters to define a bid request, to generate at least one trip bid defined by the bid parameters, where the at least one trip bid includes at least one ride in at least one vehicle operated by the first vehicle operator, and at least one ride in at least one vehicle operated by the second vehicle operator according to the predetermined vehicle schedule associated with at least one vehicle operated by the second vehicle operator, and to transmit the at least one trip bid to the at least one end user device associated with the first end user;

causing the end user device associated with the first end user to allow the first end user to generate an accepted bid by accepting the at least one trip bid transmitted to the at least one end user device associated with the first end user, and transmit the accepted bid to the at least one smart contract blockchain system such that the accepted bid is stored on the at least one ledger; and causing the at least one smart contract blockchain system to notify the first and second vehicle operators of the accepted bid to allow the first end user to take the desired trip, and upon conclusion of the desired trip associated with the accepted bid, to interface with the external currency exchange system such that the at least one smart contract blockchain system causes the external currency exchange system to distribute payment to the vehicle blockchain address associated with the vehicle that received the accepted bid.

17. A method as recited in claim 16, in which the trip comprises a plurality of trip legs, where the first and second vehicle operators each operates at least one vehicle for one of the plurality of trip legs.

18. A method as recited in claim 16, in which at least one of the plurality of vehicles is operated by a third vehicle operator and at least a third vehicle device is associated with the third vehicle operator, whereby the at least one trip bid comprises a combined bid arranged by a combination of at least two of the first, second, and third vehicle operators, in which the combined bid is associated with at least two legs of the trip.

* * * * *